United States Patent [19]

Walker

[11] Patent Number: 5,421,731

[45] Date of Patent: Jun. 6, 1995

[54] METHOD FOR TEACHING READING AND SPELLING

[76] Inventor: Susan M. Walker, 3164 Malone Dr., Montgomery, Ala. 36106

[21] Appl. No.: 67,109

[22] Filed: May 26, 1993

[51] Int. Cl.$^6$ .......................... G09B 1/00; G09B 5/00; G09B 17/00

[52] U.S. Cl. .................................. 434/167; 434/118; 434/185; 395/2.6; 364/419.01; 381/52

[58] Field of Search ............... 434/118, 156, 157, 167, 434/169, 185, 307, 308, 323, 362, 365; 395/2, 2.4, 2.56, 2.6, 2.79, 152, 400, 500, 927, 2.16, 2.28, 2.63, 2.69; 364/419.01, 419.1, 419.19, 419.12; 381/43, 51, 52

[56] References Cited

U.S. PATENT DOCUMENTS

| | | | |
|---|---|---|---|
| 4,650,423 | 3/1987 | Sprague et al. | 434/156 |
| 4,661,074 | 4/1987 | Walker . | |
| 4,696,042 | 9/1987 | Goudie | 395/2.63 |
| 4,783,761 | 11/1988 | Gray et al. | 364/419.12 |
| 4,884,972 | 12/1989 | Gasper | 434/167 X |
| 4,968,254 | 11/1990 | Gangwere et al. | 434/118 |
| 5,010,495 | 4/1991 | Willetts | 434/167 X |
| 5,111,409 | 5/1992 | Gasper et al. | 434/167 X |

OTHER PUBLICATIONS

Walker, S., "A Reading Celebration For Parents: How to Teach Your Child to Read the MasterRead Way", published in 1990.

"Remedial Techniques in Basic School Subjects", by Grace Fernald, 1943.

Gillingham et al A. "Remedial Training", 1970, 8th Edition, 1 page.

Garside et al A., "A Key to the Gillingham Manual", pp. 40–41, 7th Edition, 1960.

"A Research Prospective, 1881–1941 of William S. Grays' Reading" by John T. Guthrie, 1984, International Reading Ass. pp. 66–67.

Primary Examiner—Joe H. Cheng
Attorney, Agent, or Firm—Thomas S. Hahn

[57] ABSTRACT

The present invention generally relates to a method and apparatus for teaching reading and spelling. Specifically, the invention delineates the rules governing the syllabic division and letter sounds of one, two, three, four and five syllable words. The method employs an unique system of integration of these syllabic rules, phonograms, four sets of consonant clusters and single consonants for teaching a learner reading and spelling with either a manual or computer program.

8 Claims, 25 Drawing Sheets

Special sound phonograms

| all | alk | alt | air | are | arr | ead | ief | igh | ight |
| ild | ind | old | ost | olt | | | | | |

Dipthong phonograms

| aw | awl | au | aul | ew | oy | oil | oin | oint | oud |
| out | ound | ount | ow | owd | owl | aunch | | | |

2-Vowel phonograms

| ay | aid | ail | aim | ain | aint | ait | ea | ead | aith |
| eaf | eak | eal | eam | ean | ear | eat | eap | ee | eed |
| eef | eek | eel | eem | een | eep | eer | eet | ie | oe |
| ow | oad | oaf | oal | oak | owl | oam | oan | oap | oat |
| ue | uit | | | | | | | | |

R-controlled phonograms

| arth | arsh | ar | ard | ark | arl | arm | arn | arp | art |
| er | erd | erk | ern | ert | ir | ird | irk | irl | irm |
| irt | or | ord | ork | orm | orn | ort | ur | urk | url |
| urn | urp | urt | urst | urd | urch | | | | |

Short-vowel phonograms

| amp | ab | ad | ag | ack | am | an | and | ath | anch |
| ap | ass | ast | ash | at | atch | eb | eck | act | apt |
| ang | elf | ed | eg | ell | elt | em | en | enny | ense |
| end | eld | ep | ent | ept | ess | esh | est | et | etch |
| ex | ev | el | ind | is | iv | ib | ic | ich | ick |
| id | iff | ift | ig | ill | ilk | ilt | ond | im | in |
| ing | ink | int | iss | ist | ish | isk | oft | on | ip |
| it | itch | ix | iz | ob | ock | od | og | oll | om |
| ong | op | oss | osh | ot | otch | ox | ub | ud | os |
| ost | odd | ug | uck | ull | um | un | unt | up | uss |
| usk | ung | und | ush | ust | ut | utch | uzz | unch | uff |
| ump | ulp | | | | | | | | |

FIG. 4A

Last E phonogram

| ace | ade | age | ake | ale | ame | ane | ape | ate | ave |
| aze | eme | ene | ese | ete | ice | ide | ife | ike | ile |
| ime | ine | ipe | ire | ise | ite | ive | ize | ode | oke |
| ole | ome | one | ope | ose | ote | oze | ude | uge | uke |
| ute | | | | | | | | | |

Open syllable

| ba | ca | da | fa | ga | ha | ja | ka | la | ma |
| na | pa | qua | ra | sa | ta | va | wa | ya | za |
| be | ce | de | fe | ge | he | je | ke | le | me |
| ne | pe | que | re | se | te | ve | we | ye | ze |
| bi | ci | di | fi | gi | hi | ji | ki | li | mi |
| ni | pi | qui | ri | si | ti | vi | wi | yi | zi |
| bo | co | do | fo | go | ho | jo | ko | lo | mo |
| no | po | quo | ro | so | to | vo | wo | yo | zo |
| bu | cu | du | fu | gu | hu | ju | ku | lu | mu |
| nu | pu | qu | ru | su | tu | vu | wu | yu | zu |

FIG. 4B

2-Syllable Irregular Suffixes
- al tic y ar
- ent ic age ate

2-Syllable Regular Suffixes
- els ets ons ids fuls sions
- el et on id ful sion
- its ins ves ments tions ture
- it in ve ment tion tive
- ward ards less ings ture ish
- tial ard ed ing ure ly
- cious tience ers ty tient ern
- cial cious er age ion ests
- est ens on 3-Syllable Regular Suffixes
- ly tic hood cians i/ble ern
- ful ic er cian ion ward
- tion ve tient cial i/cal cient
- sion a/ble ment ish cal est
- tious ness tude el ed ing
- tial less ist

FIG. 5A

3-Syllable Irregular Suffixes

| ant | ate | ar/y | age | ice | ent |
|---|---|---|---|---|---|
| al | ies/ied | tive | ty | fy | or |
| an | ize | ive | y | ance | ite |
| lous | en | ture | u/al | id | ile |
| ous | ence | ure | some | in | o/ry |
| ar | a/bly | i/ty | it | on | |

4 and 5-Syllable Irregular Suffixes

| ant | once | ent | ar | ar/y | y |
|---|---|---|---|---|---|
| ate | | | | | |

4 and 5-Syllable Regular Suffixes

| ly | ic | i/ty | a/ries | i/ly | a/bly |
|---|---|---|---|---|---|
| al | er | i/ly | a/tive | tial | ary |
| tion | ar/y | ic/ally | i/a/bly | est | ion |
| ing | /u/al | er/ing | age | a/bly | ee |
| est | less | ile | i/ble | a/ries | or |
| cial | en | some | ice | tial/ly | ure |
| /a/ture | a/bly | bil/i/ty | e/ter | er/y | |
| ment | a/ble | tive/ly | ship | /i/cal | |
| sion | ate | tive | ous | er/a/tion | |
| ences | ent | a/tion | a/ble | hood | |
| ence | tious | ish | ing | tient | |
| ful | cians | ue | ize | er/a/bly | |
| tude | ness | tial | u/al | bil/i/ties | |
| cient | ist | ed | id | /u/al/ly | |
| cian | ture | an | ward | /u/a/tion | |

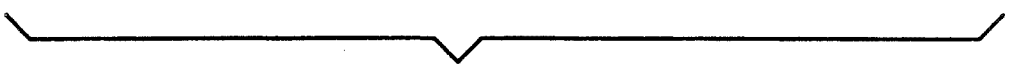

FIG. 5B

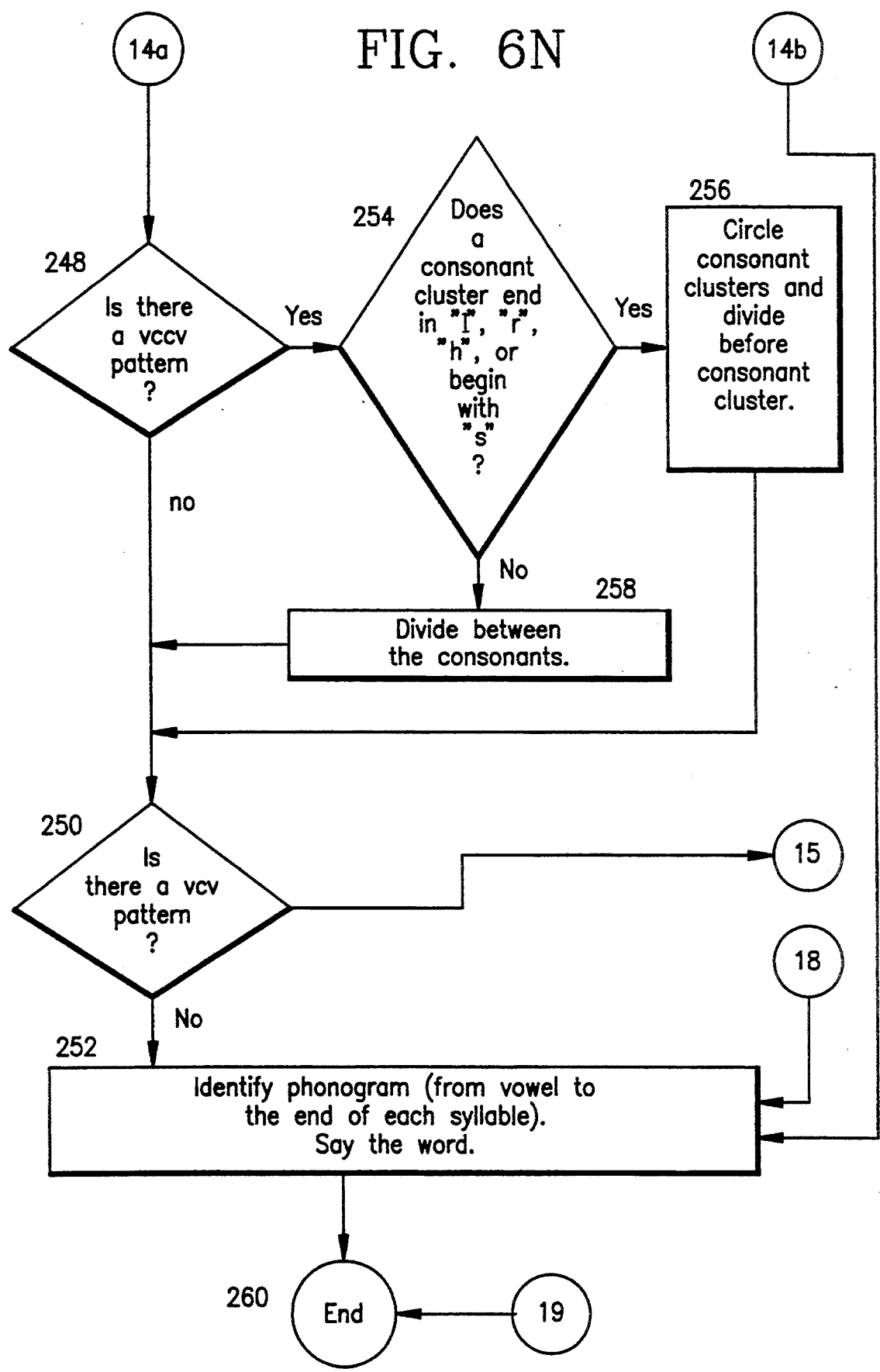

METHOD FOR TEACHING READING AND SPELLING

FIELD OF THE INVENTION

The present invention generally relates to a method and apparatus for teaching reading and spelling.

BACKGROUND OF THE INVENTION

People who are learning to read often have difficulty pronouncing the words. Older systems for decoding words are well known in the art. The Fernald Method, discussed in Grace Fernald's *Remedial Techniques in Basic School Subjects*, published in 1943 by McGraw Hill, uses a whole word approach that analyzes each letter. The Gillingham Method, discussed in *Remedial Teaching* by Anna Gillingham and Bessie W. Stillman, published by Educators Publishing Service in 1960, uses a sound blending approach of each phonics sound. The *Palto Alto Series* published in 1968 by Harcourt, Brace and World, Inc. attempted to use phonogram patterns (phonograms are word parts which are comprised of the letters of the word starting from the first vowel in the word to the end of the word or from the first vowel in a syllable in the word to the end of the particular syllable in the word) in sentences (Ex.: Nan can fan a tan man.) According to John T. Guthrie, Editor of William S. Gray's *Reading: Research Prospective, 1881-1941* published in 1984 by the International Reading Association, Inc., word identification measures (scores) in such phonic series (e.g., The Palo Alto series) increase, but comprehension does not increase as much, because of the meaningless content.

The present invention uses as a basis a system of phonogram classification previously patented by the inventor for one syllable words (U.S. Pat. No. 4,661,074), but extends the system through the delineation of syllabic division to all two, three, four and five syllable words in the English language.

SUMMARY OF THE INVENTION

The method of the present invention for teaching reading comprises presenting a learner with a word to be read, having the learner decode the word, having the learner pronounce the word and then verifying the learner's pronunciation of the word. The learner's pronunciation of the word is, preferably, auditorily verified.

The learner decodes the word by identifying the vowels in the word, then identifying the consonants in the word (beginning with the consonant after the first vowel in all words and ending with consonants preceding the last vowel in polysyllabic words), then dividing the word into syllables and, finally, then identifying the phonograms in the word. Additionally, for some polysyllabic words, the learner may identify suffixes in the word after having identified the phonograms in the word.

The method of the present invention for teaching spelling is the same as the method of teaching reading of the present invention, but comprises the additional step of having the learner encode (spell) the word after the step of verifying the learner's pronunciation of the word. The step of encoding is accomplished by having the learner spell the word by writing, typing or speaking the letters of the word.

The method of the present invention for teaching reading and spelling may also comprise the additional steps of instructing the learner with a syllabication rule to be learned and instructing the learner with a system of phonogram analysis and classification prior to presenting the learner with a word to be read or spelled.

The apparatus of the present invention for teaching reading and spelling comprises a means for presenting a learner with a word, a means for enabling the learner to decode the word, and a means for verifying a pronunciation of the word. The apparatus may further comprise a means for enabling the learner to encode the word. Additionally, the apparatus may further comprise a means for instructing the learner with a syllabication rule to be learned and a means for instructing the learner in a phonogram classification system.

The means for verifying a pronunciation of a word comprises a means for auditory pronunciation of the word. Either means will enable the learner to mentally compare his pronunciation of the word with the pronunciation of the word by the apparatus. The apparatus may further comprise a means for recognizing a pronunciation of a word.

The means for enabling the learner to decode the word may further comprise a means for enabling the learner to identify vowels in the word, a means for enabling the learner to identify consonants in the word, a means for dividing the word into syllables when applicable, and a means for enabling the learner to identify phonograms in the word. The enabling means of the apparatus may also further comprise a means for enabling the learner to identify suffixes in a word.

BRIEF DESCRIPTION OF THE DRAWINGS

FIGS. 4A and 4B are plan views of the phonograms used in the teaching method of the present invention.

FIGS. 5A and 5B are plan views of the suffixes used in the teaching method of the present invention.

DETAILED DESCRIPTION OF THE INVENTION

Figure 1:
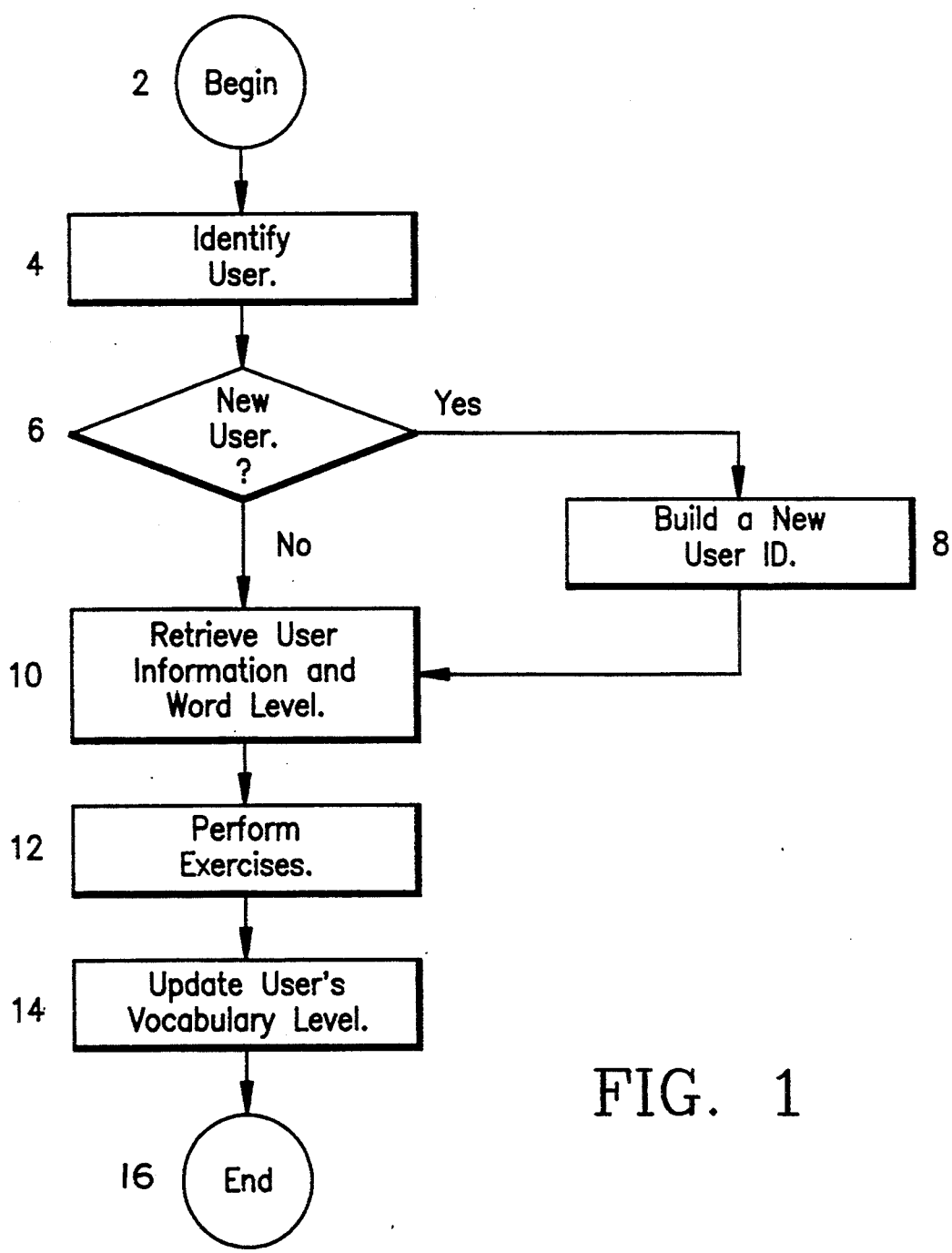
FIG. 1 is a flowchart depicting the overall performance sequence of the method of the present invention.

The system of phonogram classification originally patented by the inventor was devised for use with one syllable words and their suffixes. The one syllable system diminishes the amount of auditory blending and auditory memory required in reading. Therefore, the inventor has expanded the one syllable system to all phonetic words in the English language. This enlarged, basic system has been used by the inventor with about 2500 individuals on a one-to-one basis. Three replicated samples have shown an average gain of 33% in reading grade levels (word identification, word attack, comprehension) in twenty sessions for all students tested (male-female; black-white; normal learning-disabled attention deficit) in grades 1-12.

A confidential, experimental project was conducted by the inventor and the *Montgomery Advertiser-Journal* in Montgomery, Ala., in which parents were trained by the inventor in a seminar to teach their children to improve their reading skills through the method of the present invention. The following results were yielded over a six-week period: 1) one child went from a class 2[1] to a class 3[1] reader; 2) one child improved in reading from a grade of D to a grade of B; 3) one child went from the low reading group to the high reading group;) 4) one child went from a grade of C in reading to a grade of B; 5) one child went from a second grade reading level to a fourth grade reading level; and 6) two children read their first library book.

Previously known and unknown syllabic division rules and their exceptions were logically sequenced along with the unique grouping of consonant blends and digraphs into consonant clusters, a modification of consonants taught ("qu" considered as one consonant sound /kw/ and "x" not taught as a consonant), the description of the most prevalent patterns and rules at various syllable levels to maximize the number of words capable of fitting the system, the introduction of one new vowel rule, the introduction of one new prevalent pattern embedded in three, four, and five syllable words, and the listing of regular and irregular suffixes at the various syllable levels (regular suffixes, as defined herein, divide off from the base word and irregular suffixes cause the base word to be divided in the prevalent pattern of that syllable level). The resulting logic sequence is set forth in FIGS. 6A–6Q.

Of the 7,190 most frequently used words in the English language listed in the *Word Frequency Book* by the American Heritage Publishing Co. Inc., the method of the present invention correctly divides 78% of the words according to the *Oxford American Dictionary*. The remaining 22% (Ex.: anxious) either are not phonetic or cannot fit the restrictions currently inherent in the logic sequence of the present invention and, therefore, must be learned as sight words. These figures substantiate the figure that 86.9% of the words in the English language are phonetic words as reported by Hanna and Moore and quoted in *Diagnostic-Prescriptive Reading Instruction,* 3rd Ed. by Collins and Cheek (1989).

Thus, a major object of the present invention is to provide a system using the basic elements of the enlarged phonogram system to fit not only computer logic but also the maximum number of English words to be accommodated within the system.

Another object of the invention is to provide an infrastructure of the phonetic words of the English language that can be used with any material in English.

Yet another object of this invention is to provide a decoding strategy to be used from kindergarten to adulthood with every phonetic word in the English language. The same basic principles always apply, but additions are made as the words become more complex.

Still another object of this invention is to provide a systematic way of teaching spelling after learning to read through phonograms. Spelling (encoding) is the inverse act of reading (decoding).

An object of the present invention is to provide a teaching system comprising:

1) All the phonograms found in the most commonly used English words;

2) Syllabic division rules which include:
  a) The addition of one new rule to divide between vowel patterns "io," "ia," "iu," or "ua"; and
  b) The creation of the categories of regular and irregular suffixes with subsequent listings of such suffixes for words with two, three, four and five syllables;

3) The delineation of prefixes that are always divided off;

4) The categorization of consonant blends and consonant digraphs as consonant clusters which fit four basic patterns: those beginning with "s"; and those ending in "l", "r", and "h";

5) The delineation of a new vowel-consonant pattern embedded in many three, four, and five syllable words, i.e., vc/v/cv ("v" indicates a vowel and "c" indicates a consonant);

6) The consideration of "qu" as one consonant sound so that the phonogram system can be used—Ex.: quest; and 7) The deletion of the teaching of the many sounds of "x"; instead, words beginning with "x" are taught as sight words.

By definition, regular suffixes usually divide off the base word while irregular suffixes cause a division from the beginning of the word by the prevalent vowel-consonant pattern at that syllable level.

Figure 6A:
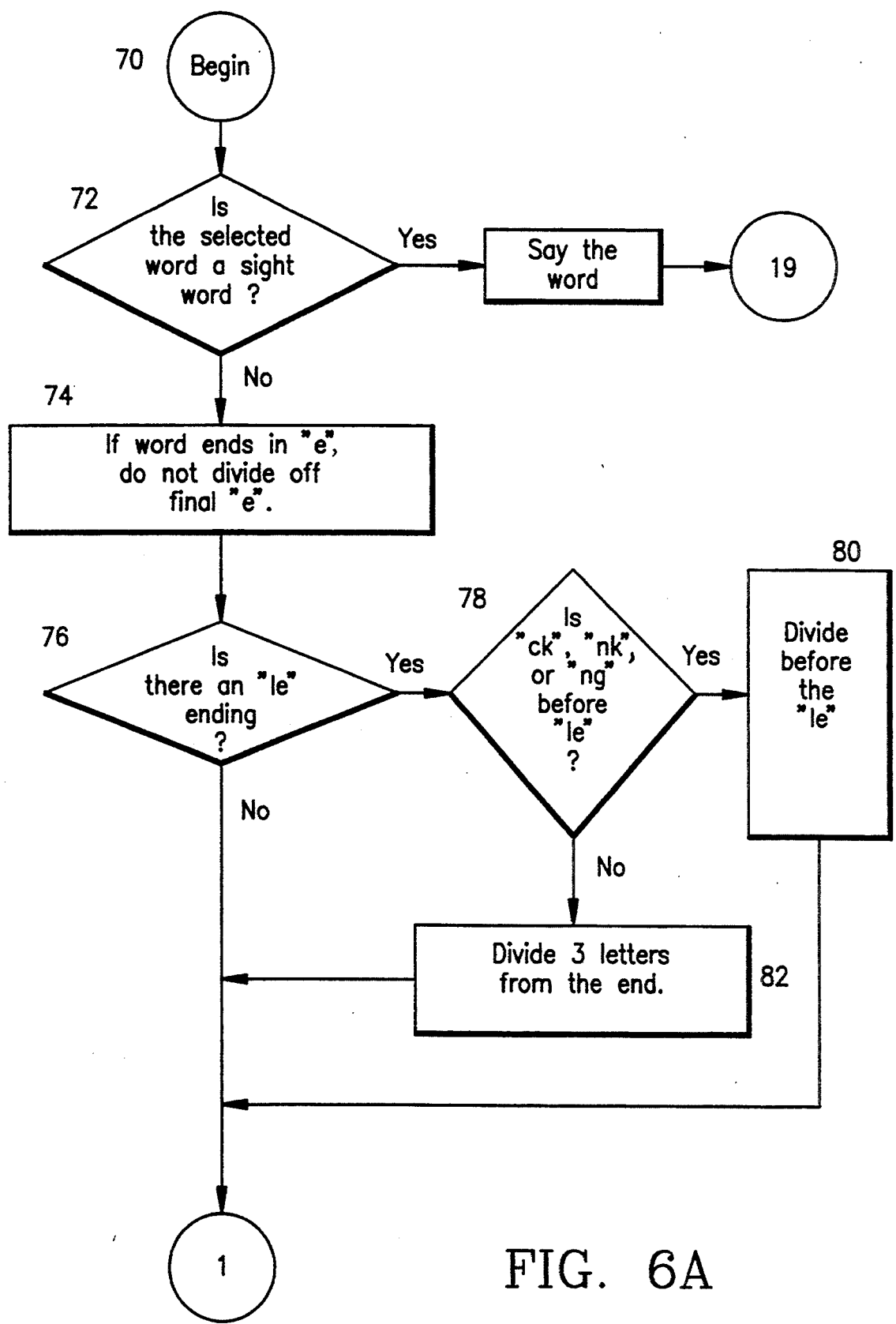
FIGS. 6A-6Q are detailed flowcharts of the teaching method of the present invention.
Figure 6B:
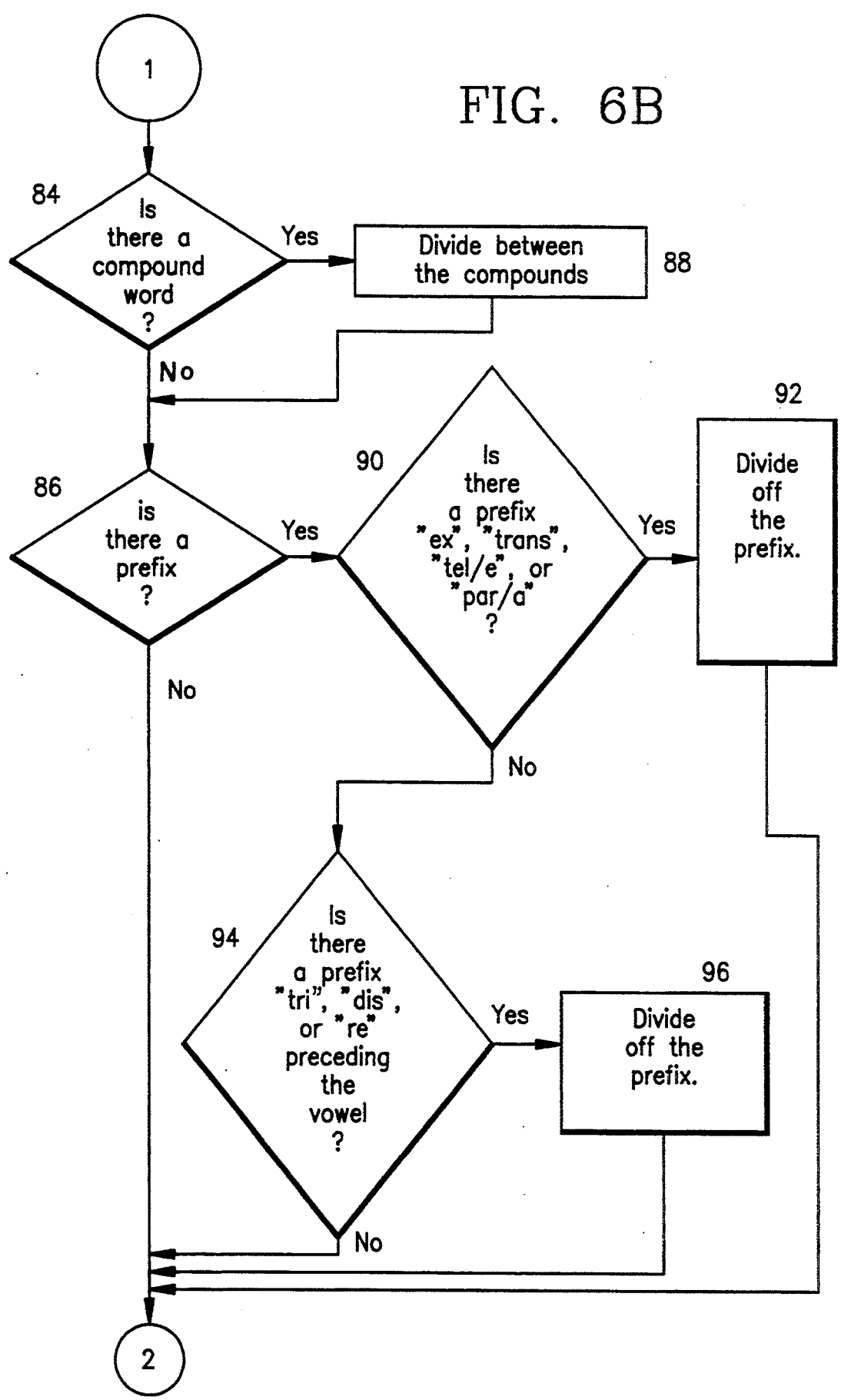
Figure 6C:
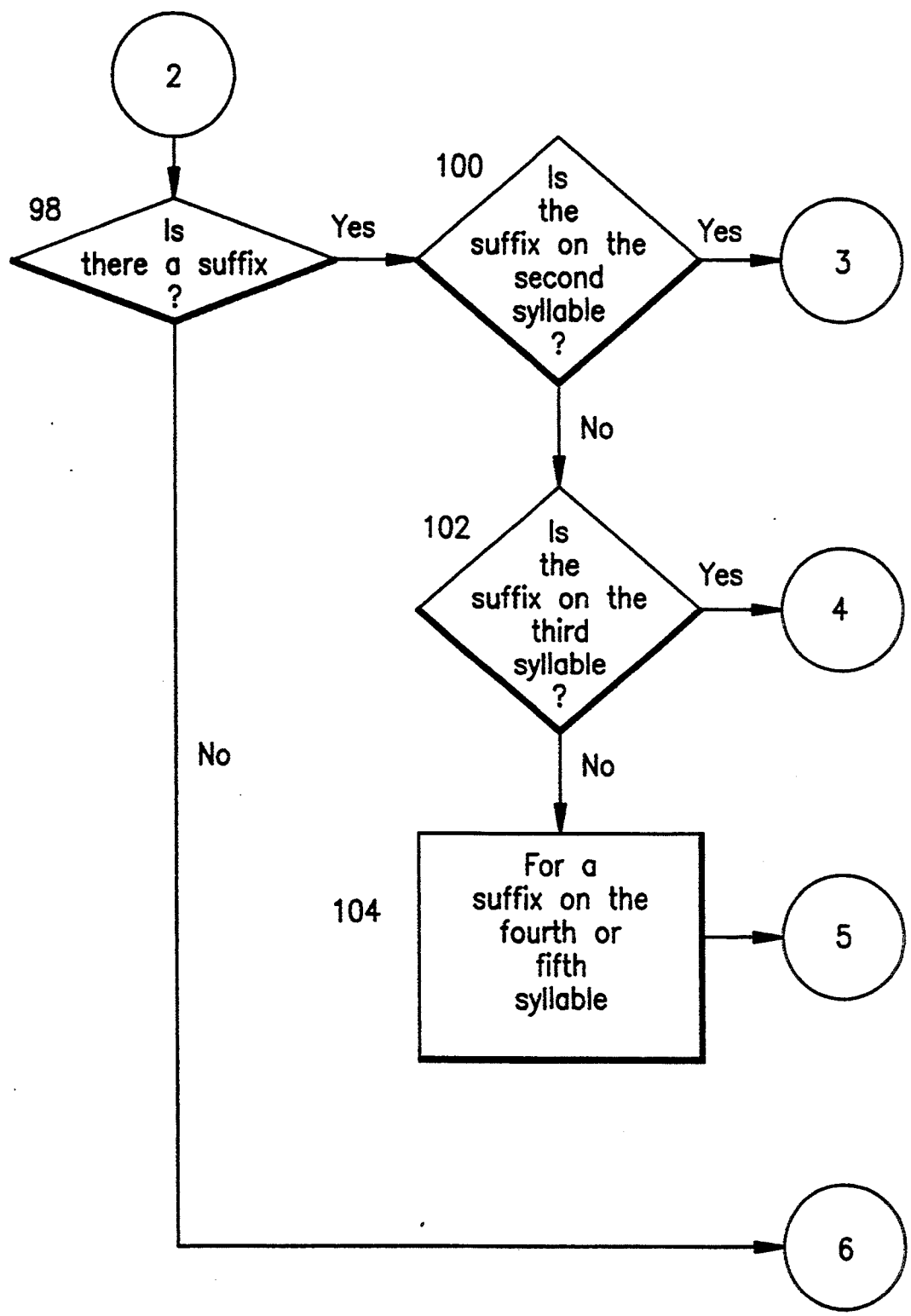
Figure 6D:
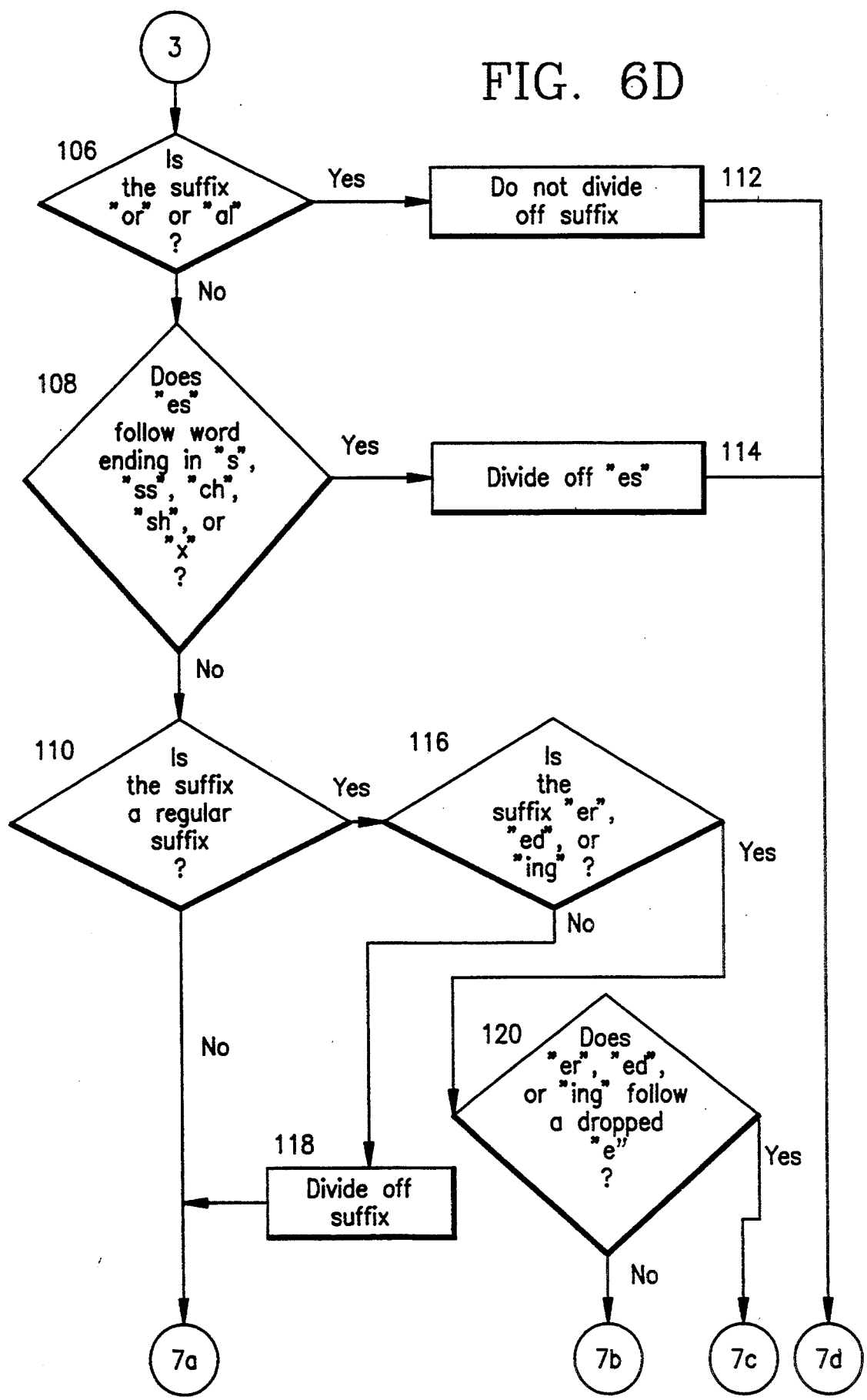
Figure 6E:
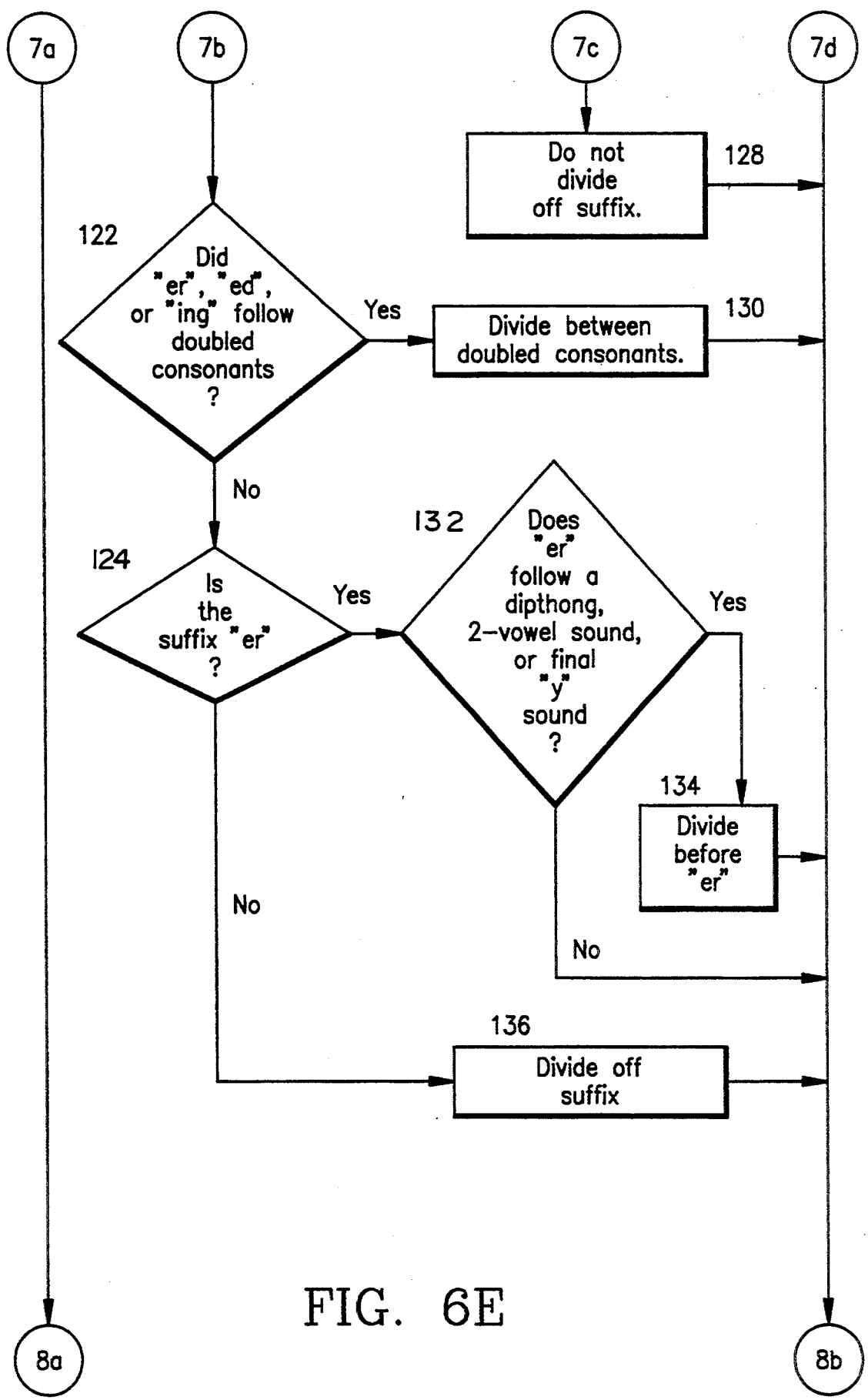
Figure 6F:
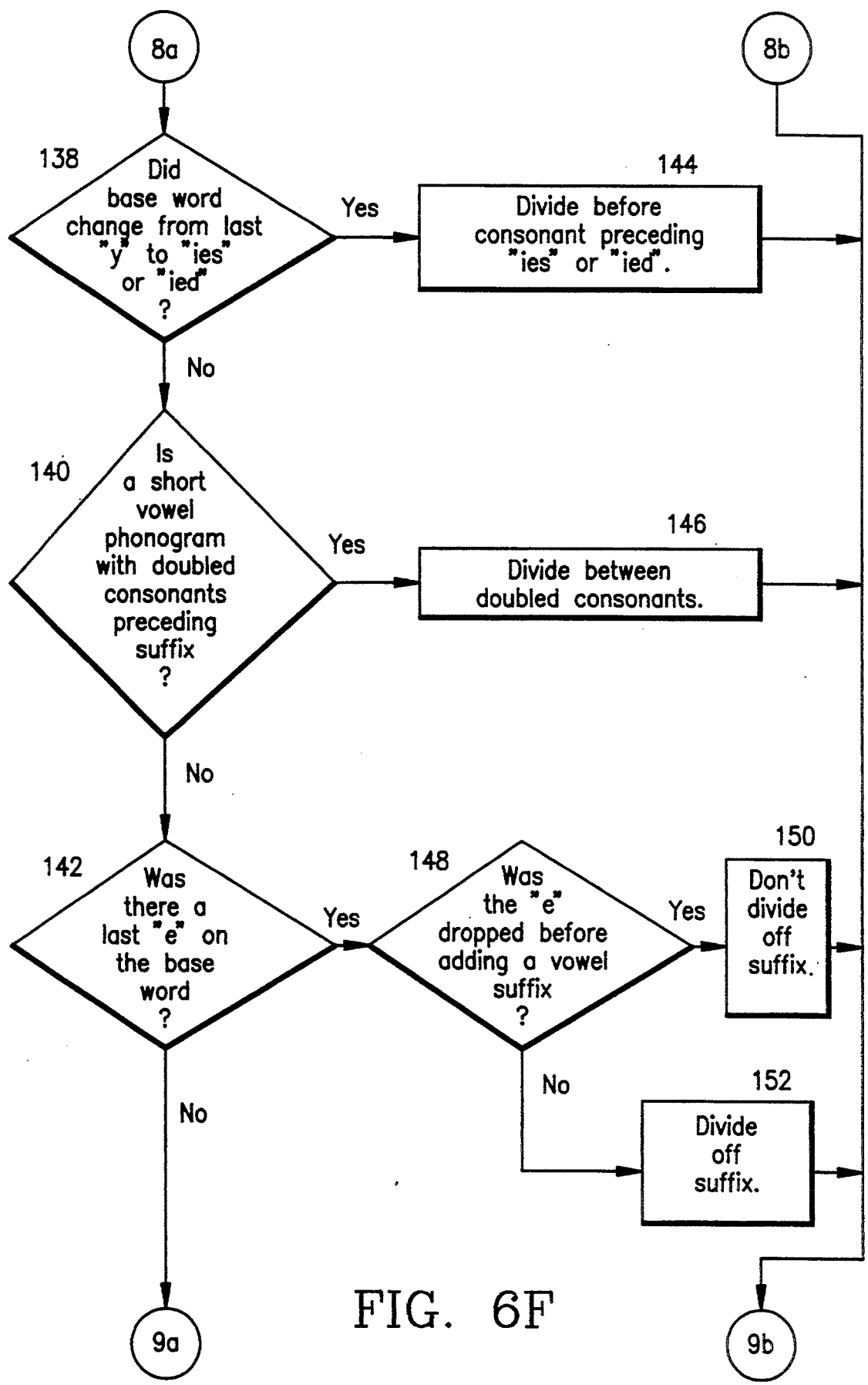
Figure 6G:
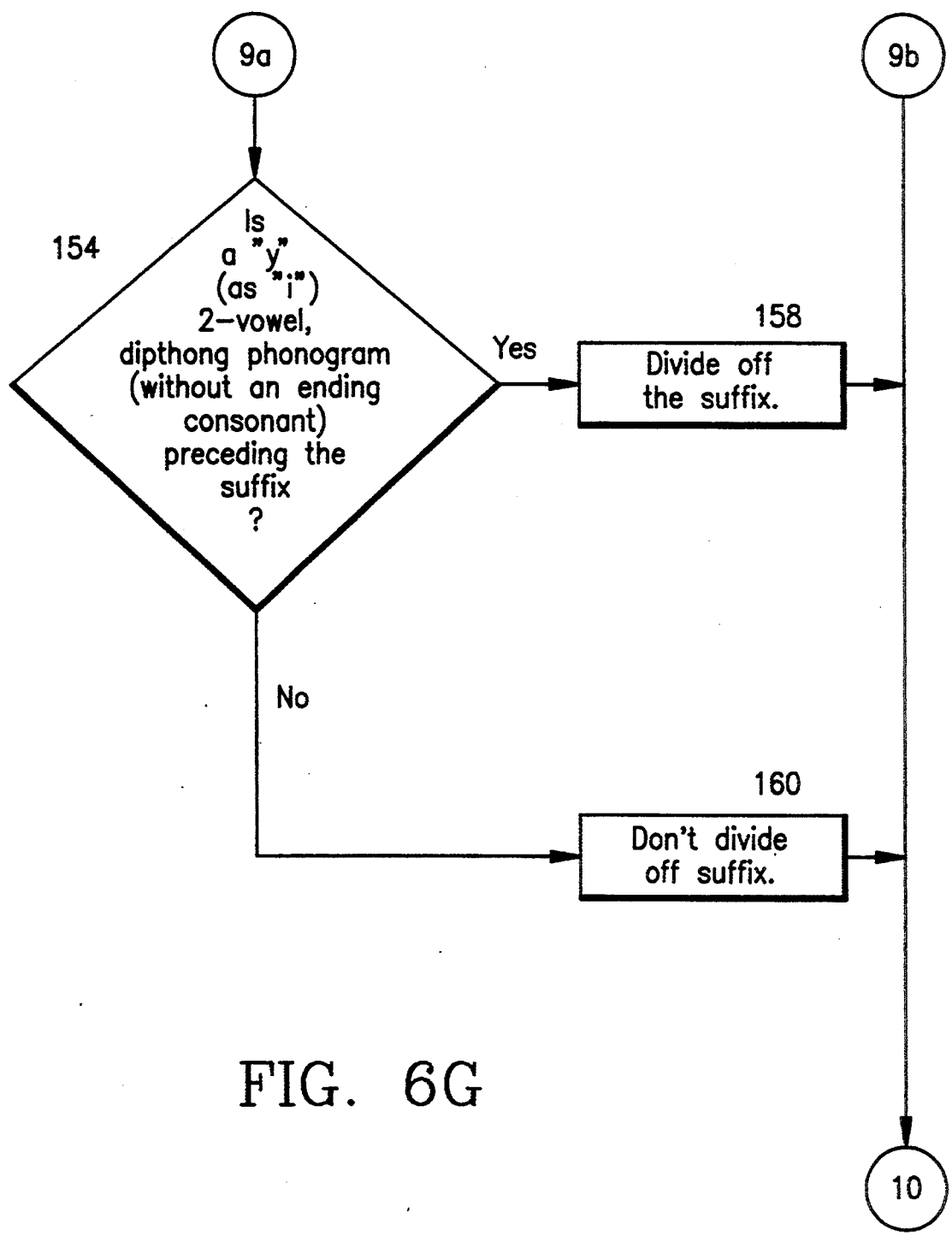
Figure 6H:
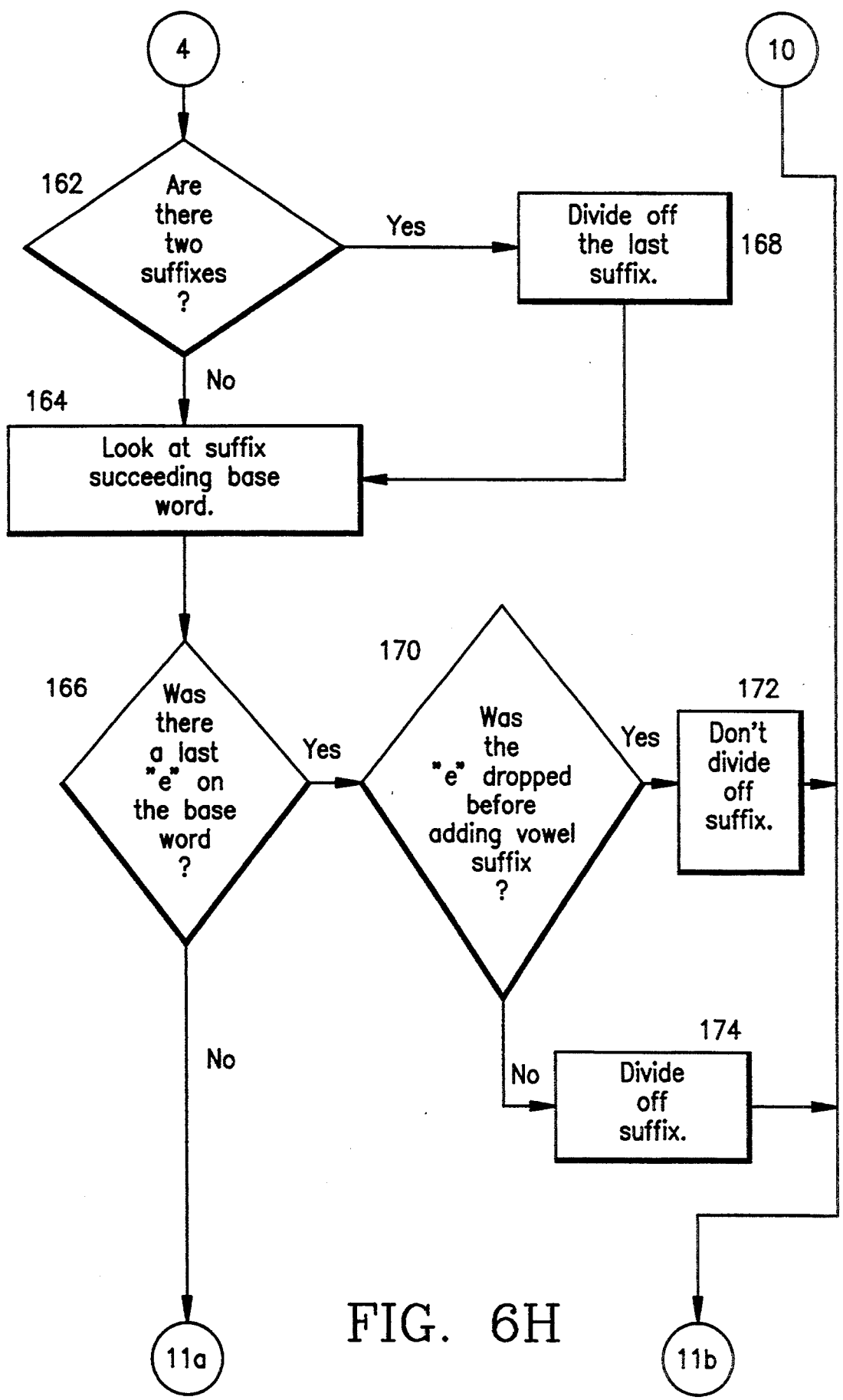
Figure 6I:
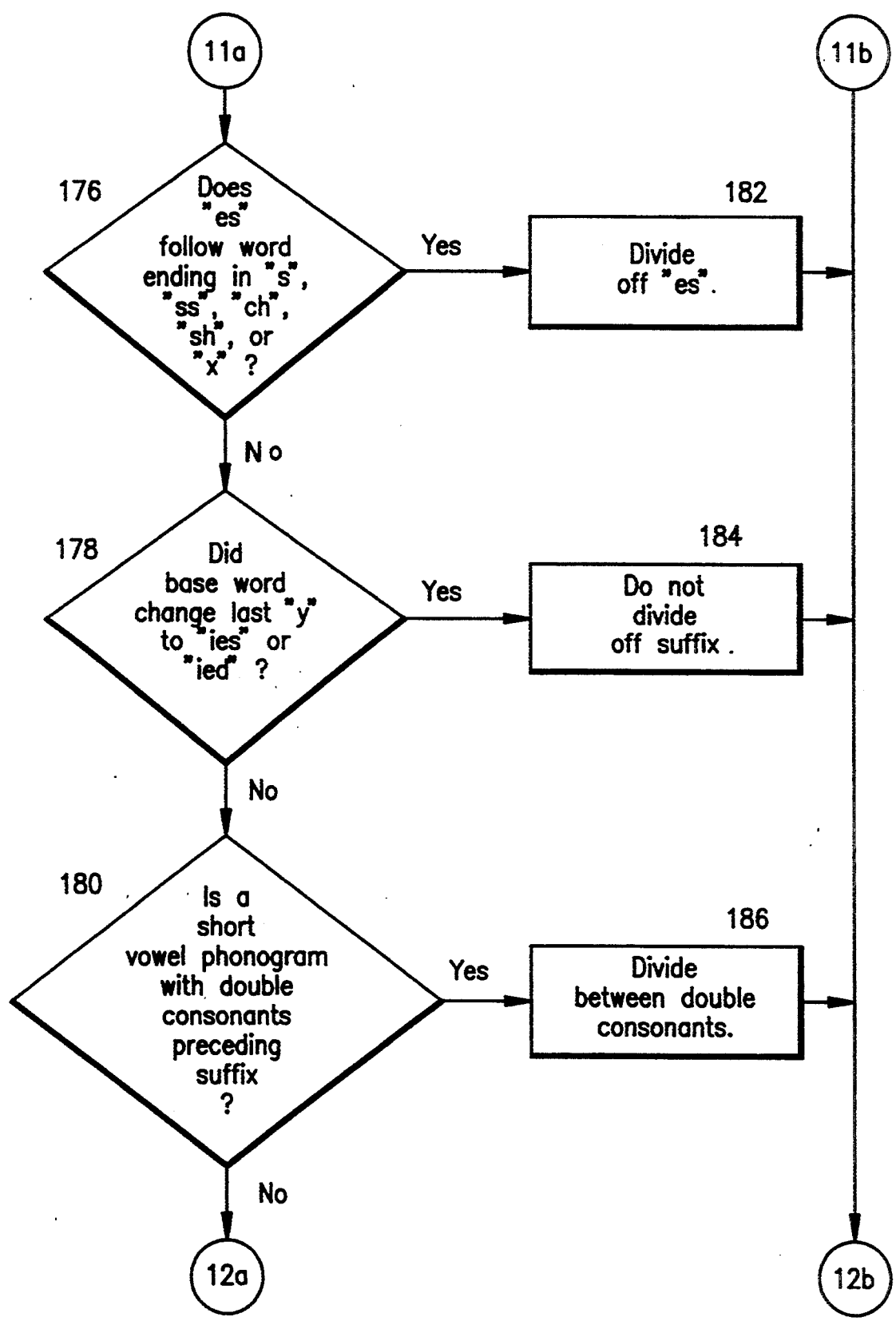
Figure 6J:
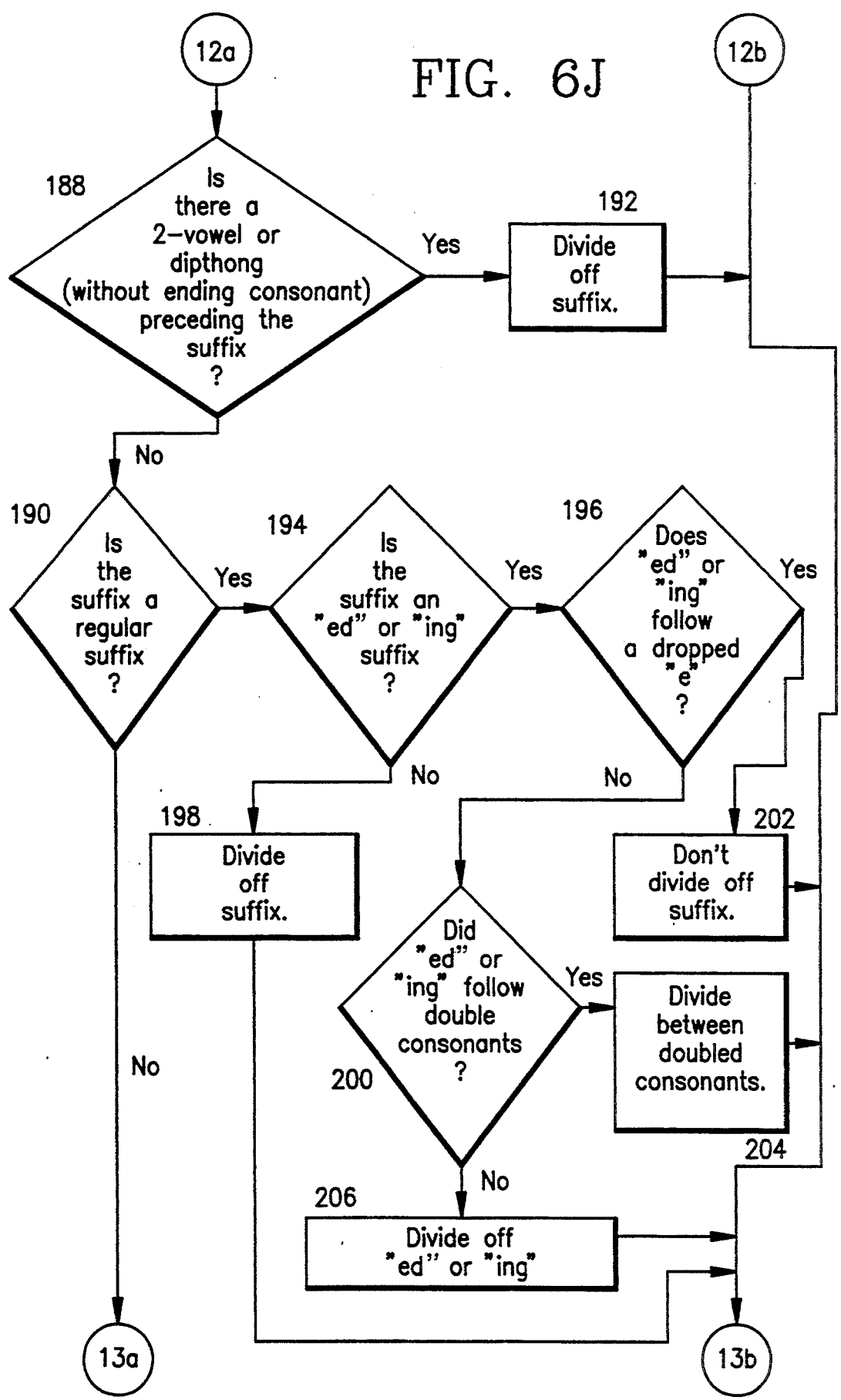
Figure 6K:
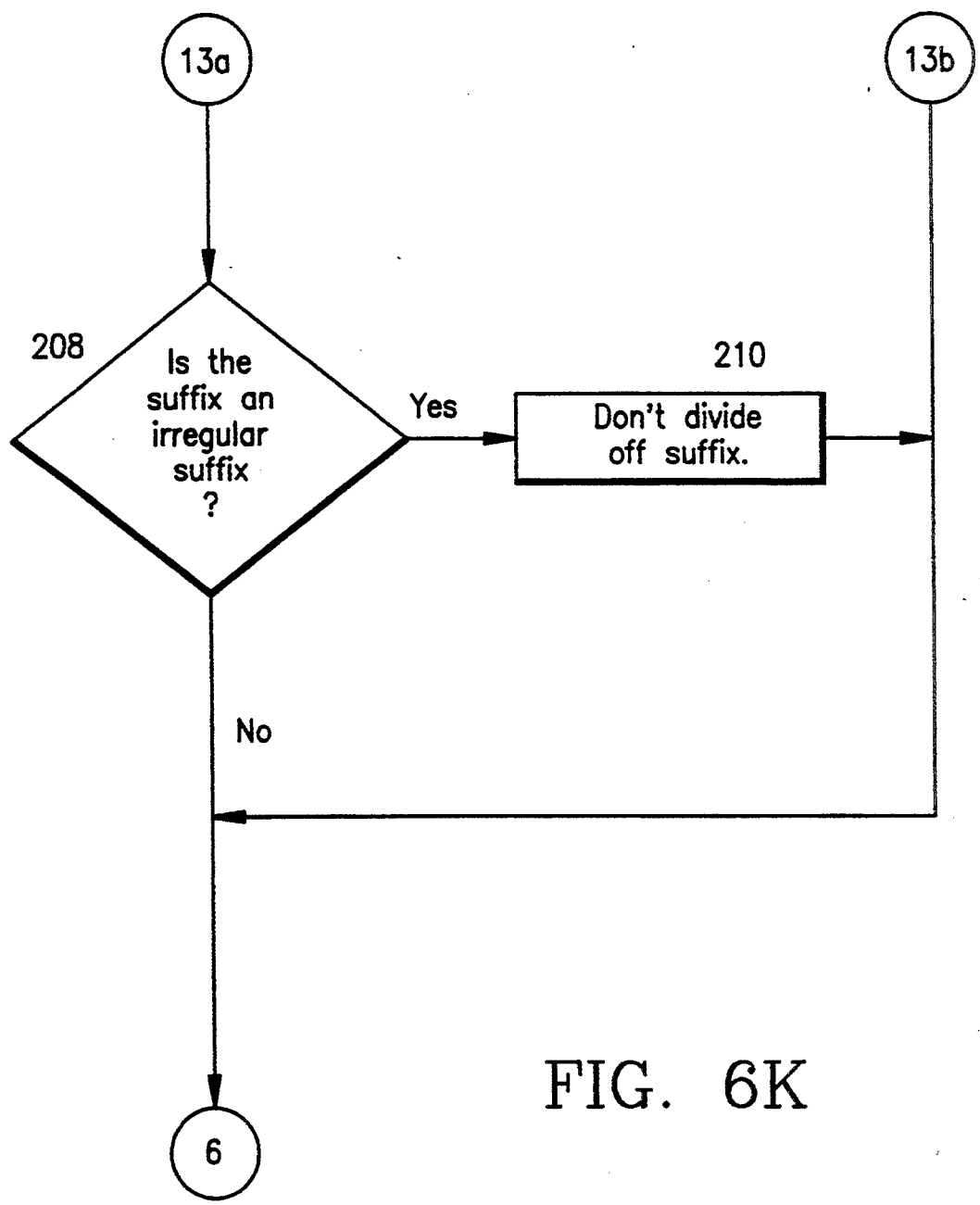
Figure 6L:
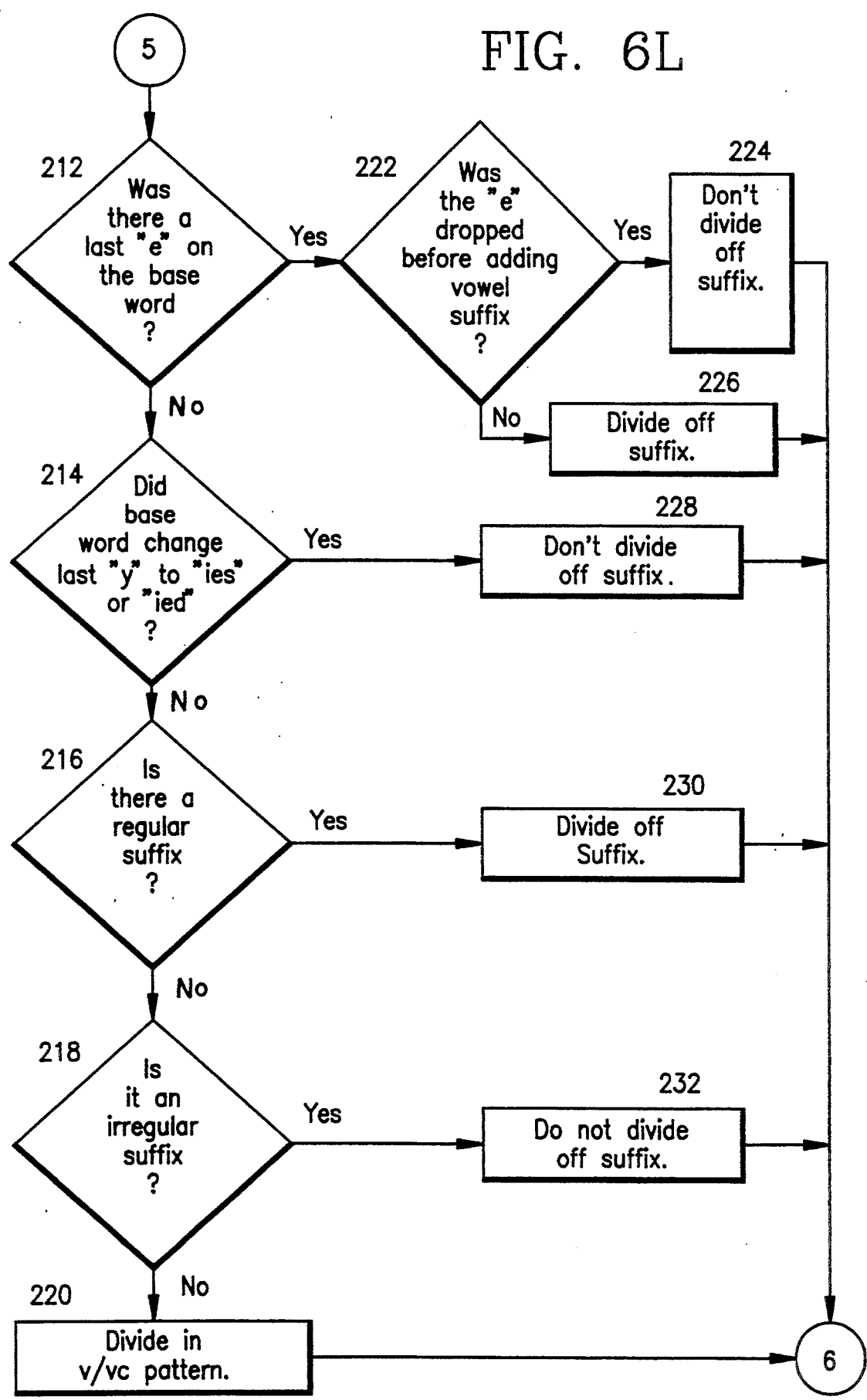
Figure 6M:
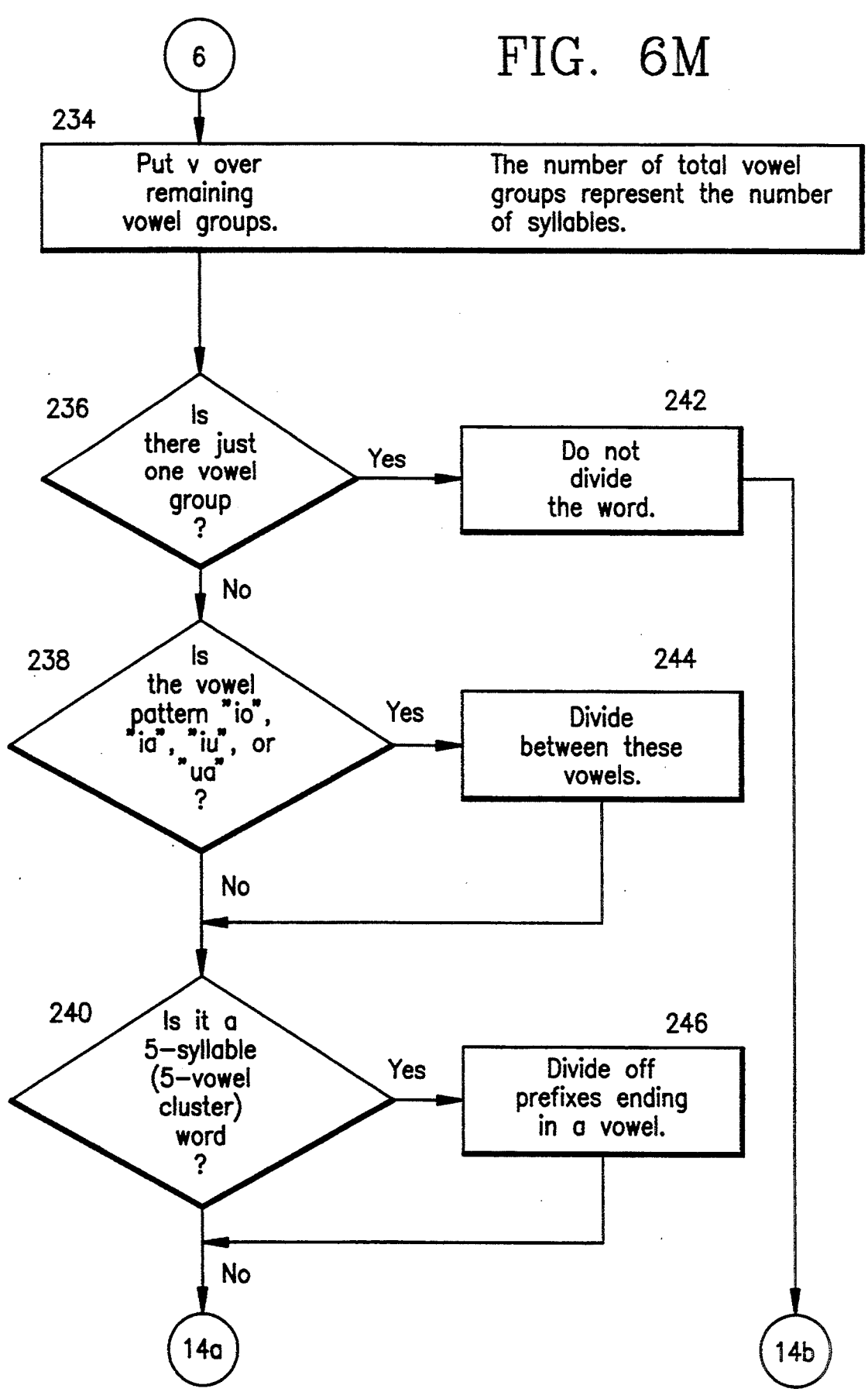
Figure 60:
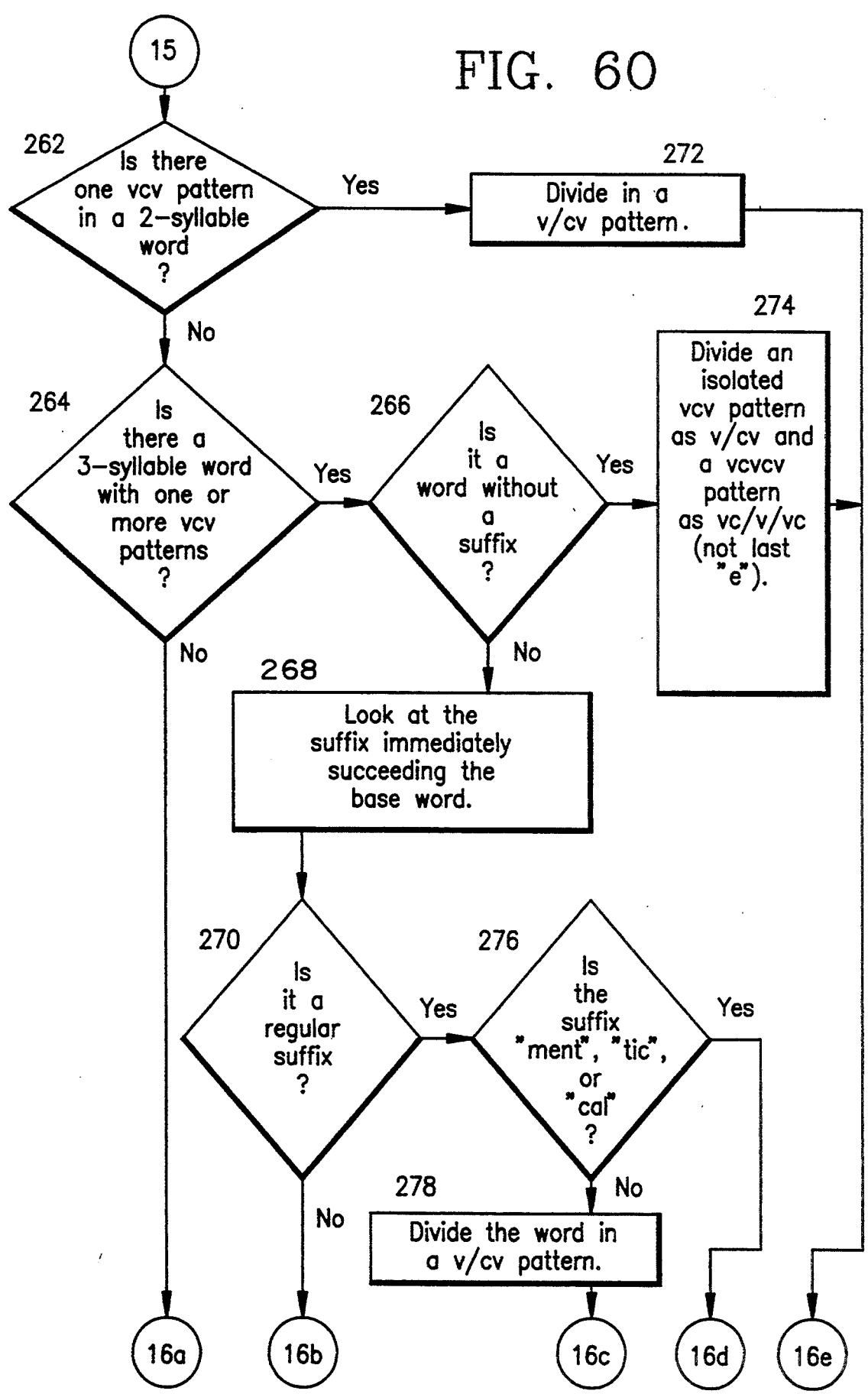
Figure 6P:
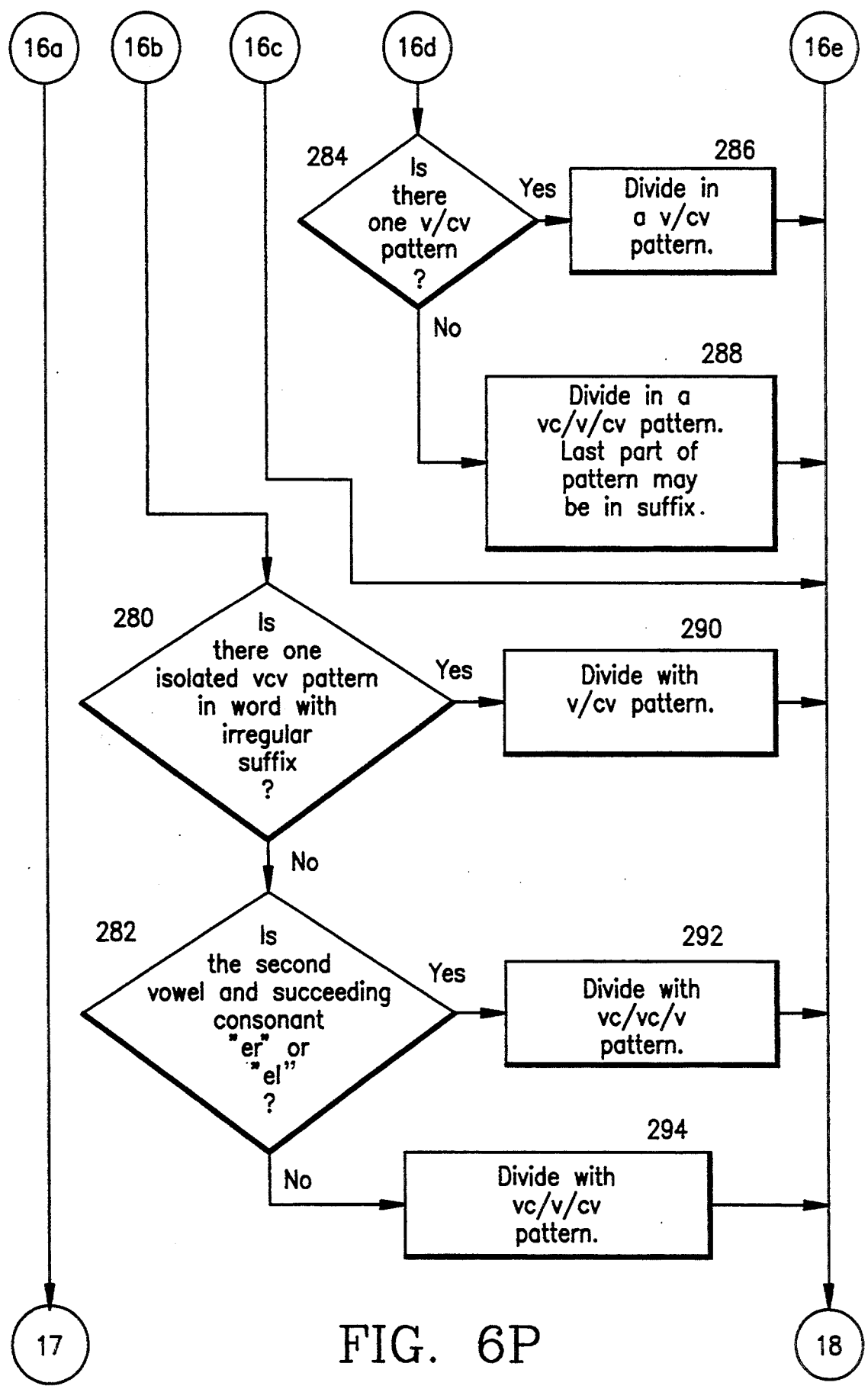
Figure 6Q:
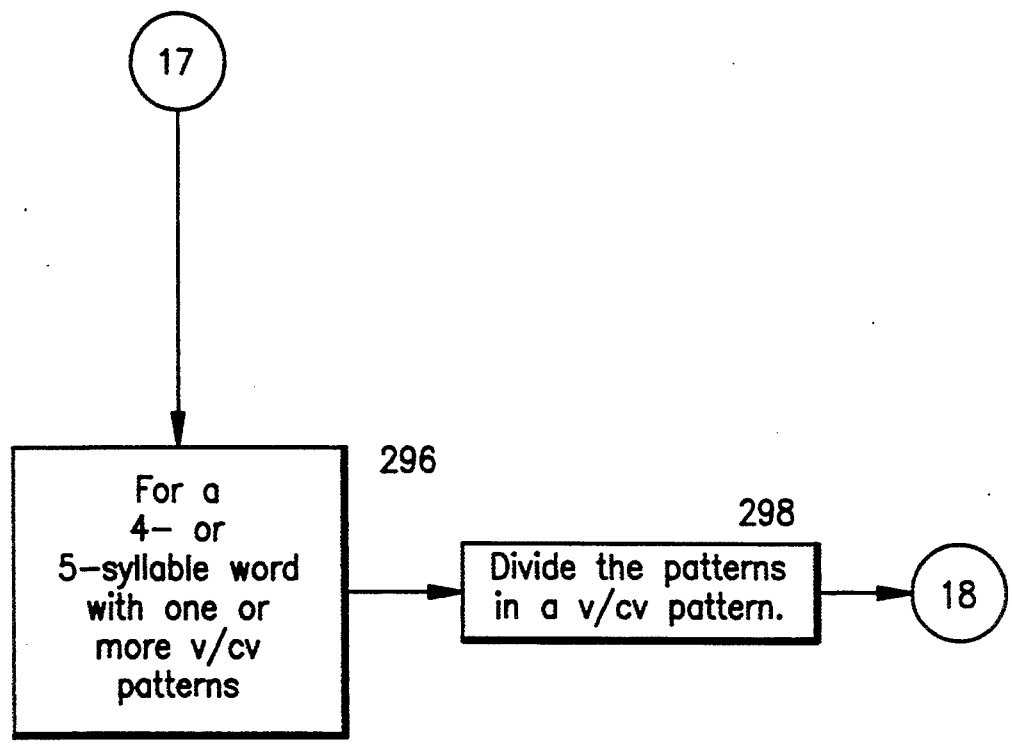

The logic system depicted in FIGS. 6A–6Q is the infrastructure of the English language. The present invention can best be used as a support system for reading contextual materials (sentences, paragraphs, chapters, documents) in business, industry, children's literature, textbooks, etc. It is suggested that a manual be compiled of non-phonetic words and that this manual be searched before beginning the use of programs developed from this system. More specifically, the present invention can best be used in four ways:

1) In a hierarchical sequencing of the system of one to five syllable words through a program designed to teach decoding skills;

2) In a game format used to reinforce the skills of decoding words developed through the teaching system;

3) In a word analysis component to be used with other programs (Ex.: a story of *Alice in Wonderland*); and 4) In a comprehensive program of the most-used words in the English language. This program could be used as a resource when a person miscues on words in business, industry, and school.

In using the method of the present invention, certain assumptions are necessary:

1) "A", "E", "I", "O" and "U" are the basic vowels "Y" and "W" are considered vowels when they follow one of the basic vowels;

2) "Y" is considered a vowel if it comes at the end of a word or syllable;

3) Two vowel and diphthong combinations are considered as one vowel when using syllabic patterns (Ex.: aŭ/buřn);

4) "Qu" is considered one consonant sound (Ex.: quest);

5) The sounds associated with the single consonant "X" are not taught; and

6) Suffixes are generally pronounced the same and provisions are made to teach these pronunciations, Ex.: "tion" says /sh n/; "tive" says /tiv/.

Before beginning to teach one syllable words, it is advisable to have animation and sound showing the single consonants and consonants and consonant clusters such as:

b as in ball and the b says/b/;

f as in fish and the f says/f/; and sm as in smoke and the sm says/sm/.

In developing the system, it is expedient to use the part of the method concerning the phonograms depicted in the inventor's previous patent (U.S. Pat. No. 4,661,074). Specifically, instruction in the seven basic categories of phonograms [short vowel (closed syllable), long vowel (open syllable), r-controlled, last "e", two vowel rule, special, and diphthongs] and their rules are suggested. These rules are as follows:

1) If there is one vowel in a word or syllable and the vowel does not end the syllable, the vowel is short (Ex.: ap, at, am, an);

2) If an "r" follows the vowel, the vowel is r-controlled (Ex.: ar, or, er, it, ur);

3) If there are two vowels in an one syllable word (or the last syllable in a polysyllabic word) and the second vowel is a final "e" then the "e" is silent and the preceding vowel is long (Ex.: cute, bride);

4) If there are two vowels together, the first one says the long sound and the second vowel is silent (Ex.: aid, aim, oak);

5) If there are two vowels together that blend to make a new sound, the vowel blend is a diphthong (Ex.: "au" "aw" "ew" "oy", "oi", "ow", "ou" ); and 6) If there is one vowel in a word or syllable and it ends the syllable, the vowel is long. This pattern is called an open syllable (Ex.: hi, me, go).

The seventh phonogram category of "special" was designated by the inventor to include all regular patterns of vowel phonograms which do not fit the aforementioned six rules. Table 1 sets forth these seven rules in tabular format.

TABLE 1

| Two vowel rule: vvc, cvvc | R-controlled | Closed syllable (short vowel): vc cvc |
|---|---|---|
| Open syllable (long vowel): cv Last e: vce | Special | Diphthongs (two vowels that blend) |

Furthermore, it is advisable to develop a procedure for marking the vowel and identifying the phonogram (from the vowel to the end of the word or syllable, Ex.: dárk).

It is helpful, but not necessary, for the learner to classify the phonograms as to vowel type (as used with the phonogram game board in U.S. Pat. No. 4,661,074 by the inventor). This classification makes the learner inherently use the thinking skills of observation, analysis, comparison and classification. These skills seem to help some learners to identify more accurately and rapidly the various phonograms.

Next the rules for reading (decoding) two syllable words are taught. Again, the learner is asked to mark the vowels and identify the phonograms in a manner such as:

bárk/ing    bằt/tểr

As depicted in the flowchart of FIGS. 6A–6Q, the system continues adding new syllabic division rules and modifying the rules as needed for three, four and five syllable words. In each instance, the learner should mark the vowel and identify the phonogram sound, for example:

cŏn/vĕr/sā/tion/al

Concomitant spelling programs can be used in two ways:

1) Through linguistic analysis of individual patterns such as at-bat-fat-cat; or 2) Through a game format in which the learner types the word and places the syllables into the seven phonogram patterns. A separate designation for suffixes could be used.

Other reinforcement games in spelling can be devised using the concepts in FIGS. 6A–6Q. It is suggested that the learner carefully visualize the word and then write or type the word since spelling is generally used in a written medium.

The method for teaching reading and spelling disclosed herein is suitable for adaptation to a computer program in addition to being practiced by a manual teaching method. If adapted to a computer program, then the program, preferably, should be written on CD Rom (an external drive is necessary) for computers such as the Macintosh LCII and LCIII or other similar computers which already have soundboard capabilities, and/or for IBM or IBM compatible computers or other similar computers which can attach Soundblaster by Creative Labs or other similar systems with soundboard attributes. Obviously, any other suitable operating system or hardware may be used to adapt the method of the present invention to a computer program. Any such alternative or modification would be within the ability and discretion of one of ordinary skill in the art.

The reading (decoding) and spelling (encoding) system can be programmed in a hierarchical sequencing of one to five syllable words. The words chosen for instruction can be selected from groups of words such as: 1) special vocabulary chosen for a specific purpose (Ex: business and industry); 2) words picked because of their frequent use in the English language; and 3) words chosen as components of other programs (Ex: all the words from a children's literature selection such as *Alice in Wonderland*).

In teaching reading or spelling, the rules for a syllable level (five levels altogether, Levels 1–5 for one to five syllable words) are presented and then a game format is used for reinforcement of the skills learned. More specifically, an eleven step computer strategy for all words is used in Levels 2–5. (A slight modification is necessary at syllable Level 1.) The strategy is as follows:

1) Rules are presented;

2) The learner or user pushes a key to bring up a list of 10 words;

3) The user performs the five-step basic strategy for decoding words (explained below) on one word at a time;

4) During the fourth step of the basic strategy for decoding, the user calls up a screen which displays the gameboard (as shown in Table 1), with the gameboard also having a circle ("suffix circle") appearing below the game board;

5) The user places the phonograms in the correct slots on the gameboard;

6) The user places the suffix in the suffix circle below the gameboard;

7) The user pushes a specified key to verify that the word parts have been correctly placed on the gameboard (i.e., the phonograms appear in the correct slots);

8) The user attempts to say the word;

9) The user pushes a specified key to activate computer pronunciation of the selected word and mentally compares his or her pronunciation to that given by the computer; and 10) The user then spells or writes the word correctly.

Within the ten step overall computer strategy, there is a five-step basic decoding (reading) strategy necessary for decoding all phonetic words in the English language from syllable Level 2 (two syllable words) through Level 5 (five syllable words). Only four of these steps are necessary at syllable Level 1. Also, at syllable Level 1, the phonogram sounds are presented. These phonogram sounds will be used in all subsequent words at all syllable levels.

It is preferred that the phonograms be presented rhythmically, such as: a-b says "ab"; t-a-b says "tab"; and f-a-b says "fab". The phonograms preferably should be presented as vowel groups [i.e., short vowel (closed syllable), r-controlled, two vowel rule, last "e", long vowel (open syllable), diphthongs and special sounds] for each vowel. That is, for instance, all the "a" vowel sounds should be presented before going to vowel "i". Furthermore, it is preferred that one vowel category (Ex: short "a") be presented at a time using an initial word within that particular vowel category which is called up from a list of words at syllable Level 1. Because the sounds of short "i" and short "e" are so similar and easily confused, it is also preferred that the vowel sounds be presented in the following order: "a" vowel, "i" vowel, "o" vowel, "e" vowel and "u" vowel. For instance, see the "a" vowel exercise lists set forth in Tables 2A–2E. Provision should also preferably be made for having the consonant/consonant sounds and consonant cluster/consonant cluster sounds presented rhythmically for those learners or users who need to learn the very basic sounds, for example:

b as in ball and the b says/b/;

and sl as in sled and the sl says/sl/.

It is preferred that all users begin with syllable Level 1 and advance through to syllable Level 5. Syllable Levels 2–5 will have multiple lists of easy words (syllabically regular words) and more difficult or hard words (syllabically irregular words, that is words which have exceptions to syllabication rules, as well as an accumulation of syllabically regular words whose rules have been previously taught). Syllable Level I will also have multiple lists of easy words (words that have phonetically regular phonograms) and hard words (words that must be learned by sight, as well as an accumulation of previously taught phonograms that are phonetically regular).

When the learner or user starts the program, a new user will build a new user identification or a previous user will retrieve user information and word levels (that is, the last syllable level worked with and whether the user had completed the easy or hard level of that particular syllable level). Again, new users should start at syllable Level 1. A user at Level 1 will be instructed to choose a list of ten one-syllable words (Ex.: "a" vowel sound words set forth in Tables 2A–2E).

TABLE 2A

Short "A" Vowel Sound - has the sound beginning "Apple"
Short Vowel Rule: If you have one vowel that does not end the word or syllable, the vowel sound is short.

| ab | ad | ag | ack | am |
|---|---|---|---|---|
| lab | bad | bag | back | ham |
| fab | mad | rag | pack | Pam |
| tab | sad | tag | tack | Sam |
| amp | an | and | ap | ass |
| camp | can | band | cap | bass |
| lamp | pan | sand | map | mass |
| ramp | van | land | tap | pass |
| ast | ash | at | atch | |
| cast | cash | bat | batch | |
| fast | mash | cat | catch | |
| past | sash | fat | patch | |

TABLE 2B

R-Controlled Sound
R-Controlled Rule: If a vowel is followed by r, then the vowel is r-controlled.

| ar | ard | ark | arl | arm |
|---|---|---|---|---|
| bar | card | bark | Carl | farm |
| car | lard | dark | quarl | harm |
| far | yard | mark | snarl | marm |
| arn | arp | art | | |
| barn | carp | cart | | |
| tarn | harp | cart | | |
| yarn | sharp | part | | |

TABLE 2C

Last E Rule - has the long vowel sound
Last E Rule: If you have a vowel-consonant-last "e" pattern, then the first vowel is long (says its name) and the last "e" is silent.

| ace | ade | age | ake | ale | ame |
|---|---|---|---|---|---|
| face | fade | cage | bake | bale | came |
| lace | made | page | cake | male | fame |
| race | wade | wage | take | sale | name |
| ane | ape | ate | ave | aze | |
| cane | cape | date | cave | daze | |
| Jane | tape | gate | save | gaze | |
| lane | shape | late | wave | maze | |

TABLE 2D

Open Syllable - has the long vowel sound
Open Syllable Rule: If one vowel ends a syllable or one syllable word, then the vowel is long.

| ba | ka | sa |
|---|---|---|
| ca | la | ta |
| da | ma | va |
| fa | na | wa |
| ga | pa | ya |
| ha | qua | za |
| ja | ra | |

TABLE 2E

Two Vowel Rule has the long vowel sound
Two Vowel Rule: When two vowels come together, the first vowel is long and the second vowel is silent.

| ay | aid | ail | aim | ain | aint | ait |
|---|---|---|---|---|---|---|
| day | laid | mail | maim | gain | faint | bait |
| may | maid | pail | | main | paint | gait |
| say | paid | tail | | rain | saint | wait |

The four-step strategy (used in reading or decoding words) that a user will perform on one word at a time is as follows:

Step 1: The user places a "v" over each vowel group.

```
              v
      Ex.:   bat
              vv
             bait
              v v
             save
```

Step 2: The user places a "c" over each consonant in the word beginning with the first vowel in the word and ending with the ending consonant in one-vowel group words or with the consonant appearing before the last vowel, if the word has a second vowel.

```
              vc
      Ex.:   bat
              vvc
             bait
              vcv
             save
```

Step 3: The user identifies the phonogram or phonograms (from the vowel to the end of the syllable) appearing in the word and indicates the type of phonogram by placing the phonogram in the correct slot on the game board (as in Table 1) which may appear on the computer screen. This could be accomplished by the user by means of function keys, directional keys, a mouse device, a touch screen or other appropriate means when using the method in the context of a computer program as opposed to a manual method. The following discussion assumes a keyboard will be used to operate the program, but the method is not limited by this particular means. Other appropriate means may be used, e.g., mouse device, touch screen, or other device, as previously mentioned.

For instance, on the first list (Table 2A), the user could select and push a specified key to cause the identified phonogram to move to the correct game board slot (Ex.: if the phonogram is a short "a" phonogram, then the phonogram would appear in the slot marked "closed syllable (short vowel)". In subsequent phonogram or word lists, the user would repeat this exercise step and move the phonogram to the correct slot. To verify the user's placement of the phonogram, a specified key could be activated by the user to indicate to the user whether the word is placed in the correct slot. Then the user may activate a specified key to hear the computer speak the short vowel "a" phonogram. This sequence is repeated with each word on a particular syllable level word list.

Step 4: The user attempts pronunciation of the word. Then the user may activate a specified key to hear the computer speak the word correctly. The user may then mentally compare his or her pronunciation with that of the computer.

After the user compares his or her pronunciation with the computer pronunciation, the user may spell the word correctly, for example, by typing the letters of the word. Alternatively, the user may write or speak the letters of the word in order to spell the word.

The ten word list previously chosen by the user will include the seven vowel patterns of "a". The user must work through at least one set of both easy and hard lists of all vowel sounds with 80% accuracy before proceeding to a next syllable level, in this example, Level 2.

Furthermore, the user must achieve 80% accuracy on any phonogram or word list within a particular vowel and syllable level before proceeding to another phonogram or word list within the same particular vowel and syllable level. The following user rewards upon completion of an exercise are suggested: 100% accuracy—You're excellent!; 90% accuracy—You're almost perfect!; 80% accuracy—You pass to the next level!; and 70% accuracy or below—Try again! These rewards may be presented by flashing the words on the computer screen. Obviously, different reward systems could be created.

Syllable Levels 2 through 5 contain one additional step, making the method a five-step teaching method for these levels. This additional step occurs between Steps 2 and 3; thus original Steps 3 and 4 become Steps 4 and 5, respectively. The additional step, new Step 3, involves dividing off suffixes from the word and dividing up polysyllabic words according to the basic syllabication rules set forth in Table 3.

TABLE 3

| Regular Rule: | Exception to Rule: |
|---|---|
| 1. If there is a vowel, consonant, consonant, vowel letter pattern, then divide between the consonants.<br>Ex.: vc/cv<br>but/ter | 1. If there is a vowel, consonant, consonant, vowel pattern and the consonants are a consonant cluster, then consider the consonant cluster as one sound and divide before the cluster.<br>Ex.: v/ccv<br>mi/grate |
| 2. If there is a vowel, consonant, vowel letter pattern, then divide before the consonant<br>Ex.: v/cv<br>a/go | 2. If there is a vowel, consonant, vowel pattern and the word does not sound like an English word when pronounced and divided as v/cv, then divide after the consonant as vc/v*.<br>Ex.: vc/v<br>sav/age<br>rap/id |

*That is, the word, if divided as v/cv, will not sound right or "ring true" to the user's ear as a word in the English language or in the user's repertoire. If divided as v/cv, then the examples given would be pronounced as sā/văge and rā/pid, which would seen incorrect to a user, especially when the word is within the context of a sentence.

Therefore, with the New Step 3 added in, the method steps would be, for example:

Step 1: The user places a "v" over each vowel group.

Ex.: a b a n d o n

Step 2: The user places a "c" over each consonant.

Ex.: a b a n d o n

New Step 3: The user divides off the suffix from the word, if there is a suffix, and then divides the rest of the word according to the vowel-consonant patterns in the word.

Ex.: a/b a n/d o n

Ex.: i m/m i/g r a/t i o n

Step 4: The user identifies only the phonogram or phonograms appearing in the word, excepting any suffix which may appear in the word.

a/b a n//d o n i m/m i/g r a/t i o n

Step 5: The user attempts pronunciation of the word. The method described above may be used with all polysyllabic words in integration with other rules at a particular syllable level. A compilation of syllable rules that are similar and different at the various syllable levels appear in Table 4. Because of the multiplicity of rules at each syllable level, it is preferred that a limited number of rules be presented to a learner or user at any one time, along with a reinforcement list of words using the rules in question. For example, the one rule at syllable level one is presented; then, the twenty rules at syllable level two are gradually presented. This process continues for each syllable level. (As seen in Table 4, some syllable rules are similar at several syllable levels.) In addition, following the presentation of suffix rules at a given syllable level, provision should be made for the learner or user to hear the pronunciation of the suffixes presented. Multiple lists of words should be used at each syllable level and the lists should be cumulative in their application of rules.

TABLE 4

| DEGREE OF DIFFICULTY (Easy = E, Hard = H) LEVEL | | | | | |
|---|---|---|---|---|---|
| 1 | 2 | 3 | 4 | 5 | SYLLABICATION RULE |
| E | E | E | E | E | If a word ends in "e", don't divide off final "e". |
| E | | | | | If there is an "le" ending, divide three letters from the end. |
| H | | | | | If "ck", "nk", or "ng" cones before "le", divide before the "le". |
| E | | | | | Divde compound words. |
| E | E | E | E | E | If there is a prefix "ex", "trans", "tel/e", or "par/a", divide off prefix. |
| E | E | E | E | | If there is a prefix "tri", "dig", or "re" preceding a vowel, divide off prefix. |
| E | E | | | | If "es" follows a word ending in "s", "ss", "ch", "sh", or "x", divide off "es". |
| E | E | E | E | | Divide off regular suffixes. |
| E | E | | | | If "er", "ed", or "ing" follows double consonants, divide between double consonants. |
| E | E | | | | If "er" follows a dipthong, a 2-vowel sound or final "y" sound, divide before "er". |
| E | E | E | E | | If "ed" or "ing" does not follow a dropped "e" or doubled consonants, divide off "ed" or "ing". |
| E | | | | | If base word changed last "y" to "ies" or "ied", divide before consonant preceding "ies" or "ied". |
| | H | H | H | | If base word changed last "y" to "ies" or "ied", don't divide off suffix. |
| E | E | | | | If a short vowel phonogran with doubled consonants precedes the suffix, divide between the doubled consonants. |
| E | E | | | | If a final "y" as "i", 2 vowel, or diphthong (without and ending consonant) precedes the suffix, divide off suffix. |
| E | E | E | E | | If last "e" on word was not dropped before adding suffix, divide off the suffix. |
| E | E | E | E | | If there are vowel patterns "io", "ia", "iu", or "ua", divide between the vowels. |
| H | | | | | If the suffix if "or" or "al", do not divide off suffix. |
| H | H | | | | If the regular suffix "er", "ed" or "wing" follows a dropped "e", do not divide off suffix. |
| H | H | H | H | | Don't divide off irregular suffixes. |
| H | H | | | | If the "e" was dropped before adding a vowel suffix (other than "er", "ed", or "ing"), don't divide off suffix. |
| | H | H | H | | If there are two suffixes, divide off the last suffix. |
| | E | | | | If there is one isolated vcv pattern in a 3- |

TABLE 4-continued

| DEGREE OF DIFFICULTY (Easy = E, Hard = H) LEVEL | | | | | |
|---|---|---|---|---|---|
| 1 | 2 | 3 | 4 | 5 | SYLLABICATION RULE |
| | | | | | syllable word, divide the pattern v/cv. |
| | E | | | | If there is a vcvcv pattern in a 3-syllable word, divide the pattern vc/v/cv when the last vowel in not last "e". |
| | E | | | | If the suffix "ment", "tic", or "cal" immediately succeeds the base word in a 3-syllable word, and if there is a vcvcv pattern, divide the pattern vc/v/cv. The last part may be in the suffix. |
| | E | | | | If there is a regular suffix immediately succeeding the base word in a 3-syllable word and the suffix is not "ment", "tic", or "cal", divide the word in a v/cv pattern. |
| | E | | | | If there is one vcv pattern in a 3-syllable word with an irregular suffix, divide with a v/cv pattern. |
| | H | | | | If the second vowel and succeeding consonant are "er" or "el", divide with a vc/vc/v pattern. |
| | E | | | | If there is a vcvcv pattern with an irregular suffix and the second vc is not "er" or "el", divide the pattern vc/v/cv. |
| | | | E | E | If there in a 5-syllable word, divide off prefixes ending in a vowel. |
| | | | E | E | If there is more than one vcv pattern in a 4- or 5-syllable word, divide the pattern v/cv. |
| | E | | | | If the suffix "ment", "tic", or "cal" immediately succeeds the base word in a 3-syllable word, and if ther is one vcv pattern, divide v/cv. |

FIGS. 1-3 and 6 are flowcharts which depict a logic sequence which may be applied for development of a computer program embodying the method of teaching reading and spelling set forth herein. Specifically, FIG. 6 depicts the logic sequence incorporating all the syllabication rules of Table 4 which are employed in the method of the present invention. These rules may or may not need to be incorporated into a computer program embodying the method of the present invention. Such a determination would be within the discretion of a computer programmer of ordinary skill in the art. However, these rules are the foundation of the method of the present invention and are set forth for the purpose of enablement.

Figure 2:
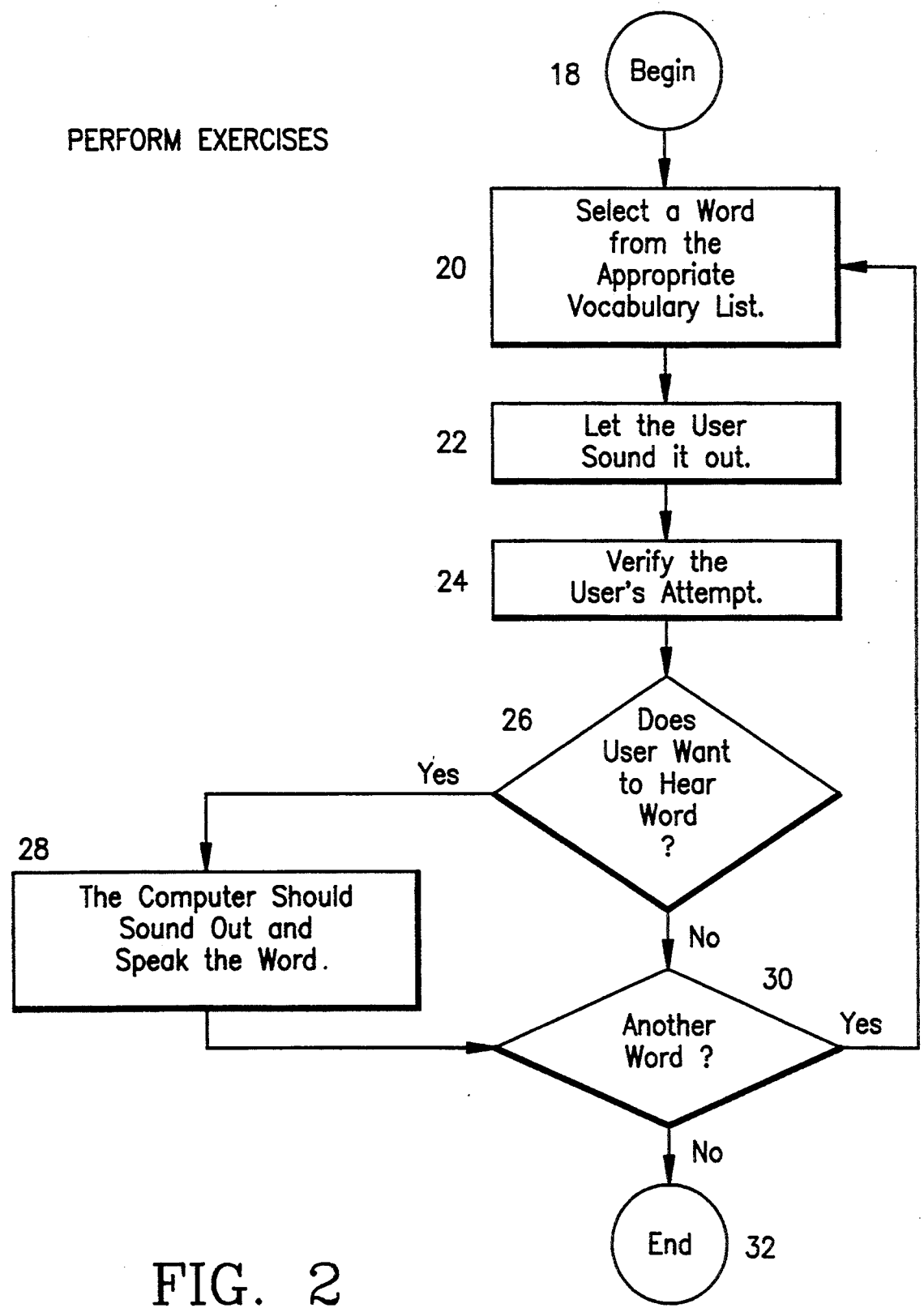
FIG. 2 is a flowchart in more detail of the exercise performance sequence of the method of the present method.

As previously mentioned, the method for teaching reading and spelling of the present invention is suitable for adaptation to a computer program. FIG. 1 depicts the overall sequence of such a computer program. A learner or user begins 2 the program by identifying himself or herself 4. If the user is a new user then a new user identification 8 is created by the program. Next, whether a new or existing user, the particular user information and word level is retrieved 10. The user then performs, in accordance with the method of the present invention, the reading and/or spelling exercise presented 12, the user's vocabulary level 14 is updated and the user ends the program FIG. 2 is a flowchart depicting the sequence in which the reading and/or spelling exercises may be performed. The user begins 18 the performance of the exercises by selecting a word from the appropriate vocabulary list 20 which the user will sound out 22. The attempted pronunciation is verified 24 and, if desired, sounded out for the user 26, 28. Otherwise, the user may proceed directly to choosing another word for performance 30 and to repeating the sequence 20, 22, 24, 26, or the user may end the program 32.

Figure 3A:
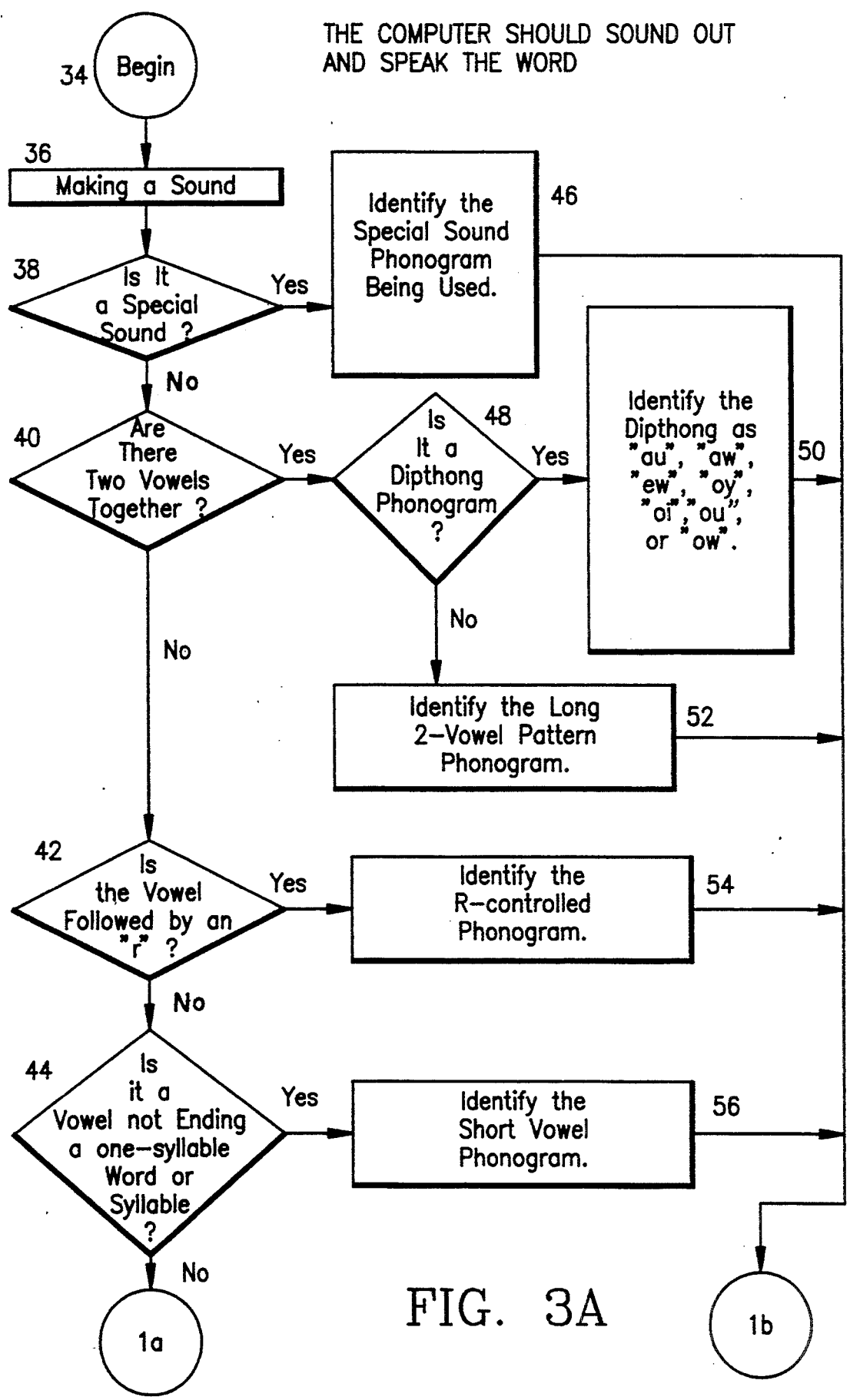
FIGS. 3A and 3B are flowcharts in brief of the teaching method of the present invention.
Figure 3B:
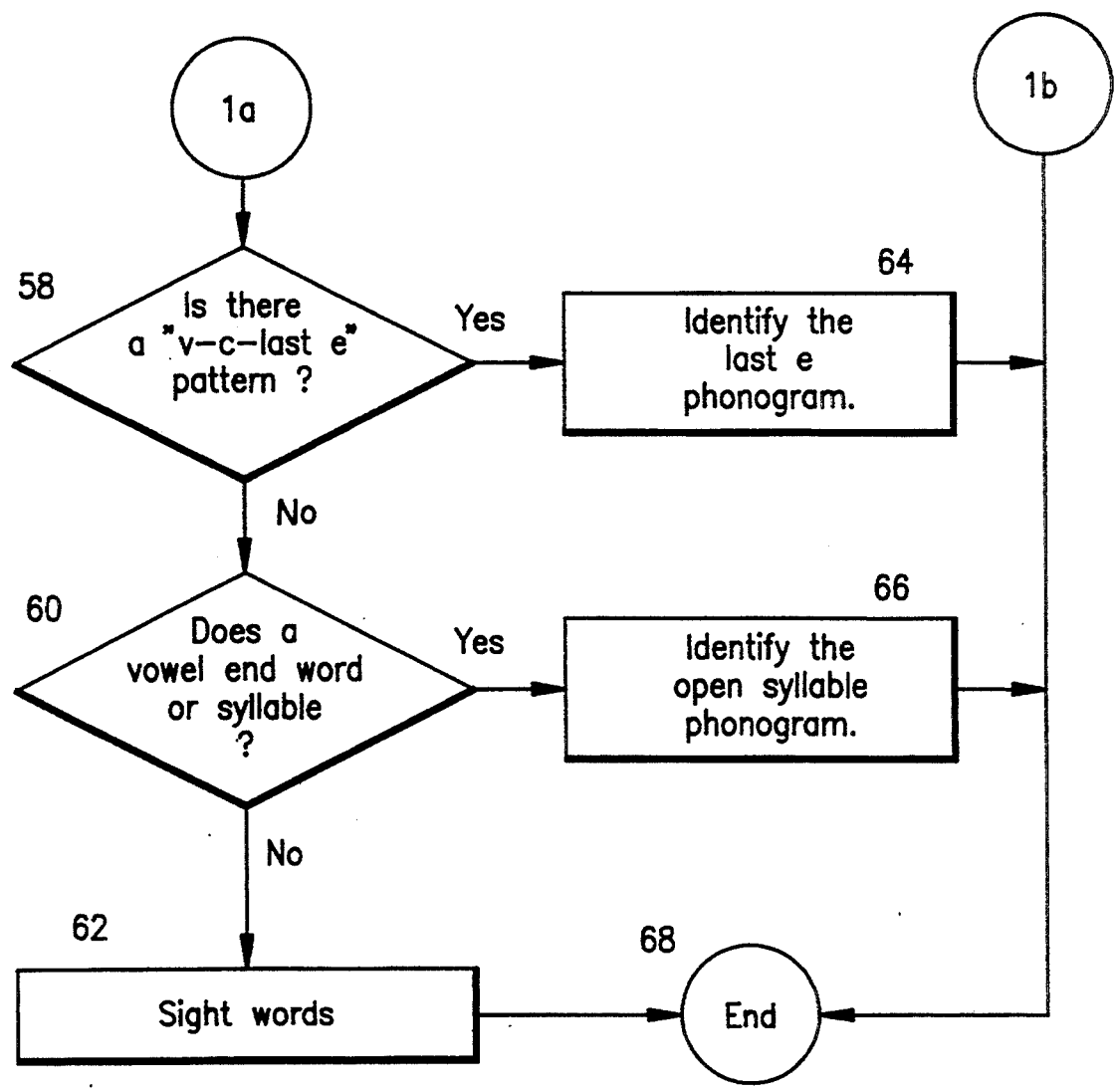

In an alternative embodiment of the method of the present invention, as set forth in FIGS. 3A and 3B, the user begins the computer program 34 by making a sound 36. The computer program determines if it is a special sound 38 and, if so, identifies the special sound phonogram being used 46 and ends the program 68 by sounding out and speaking the word. Typically, the computer program will end by sounding out and speaking the word the user has attempted to pronounce.

If it is not a special sound 38, then the program determines if there are two vowels together 40, and, if so, if the sound is a diphthong phonogram 48. If it is not a diphthong phonogram 48, then the program identifies the long two-vowel pattern phonogram 52 and ends 68. Otherwise, the program identifies the diphthong as "au", "aw", "ew", "oy", "oi", "ou", or "ow" 50 and ends 68.

If it is not a special sound 38 or there are not two vowels together 40, then the program will determine if the vowel sound is followed by an "r" 42. If so, the program identifies the r-controlled phonogram 54 and ends 68.

If the sound is not a vowel followed by an "r" 42, then the program will determine if the sound is a vowel not ending a one-syllable word or syllable 44. If so, the program identifies the short vowel phonogram 56 and ends 68. Otherwise, the program identifies if there is a "vowel-consonant-last e" pattern 58 in the sound and, if so, identifies the last e phonogram 64 and ends If there is no "vowel-consonant-last e" pattern 58 in the sound, then the program determines if a vowel ends the word or syllable 60 and, if so, identifies the open syllable phonogram and ends 68. Otherwise, if the sound does not meet any of the threshold criteria 38, 40, 42, 44, 58 or 60, then the sound is identified as a sight word 62 and the program ends.

All of the phonograms and open syllables for the various vowels which the program may incorporate are shown in FIGS. 4A and 4B. FIGS. 5A and 5B indicate all of the two-syllable regular and irregular suffixes, three-syllable regular and irregular suffixes, and four- and five-syllable regular and irregular suffixes which are used in the computer program to teach a user reading and spelling as set forth in the flowchart in FIGS. 6A–6Q.

FIGS. 6A–6Q are a flowchart depicting the logic involved in syllabication which a computer program may employ in a method for teaching reading and spelling. When a user begins the program 70 the program first checks to see if the word selected by the user is a sight word 72. If it is a sight word, then the computer will speak the word and end 260.

Otherwise the program will see if the word ends in "e" 74; if so, the final "e" is not divided off the word. Next, the program will check to see if the word has an "le" 76 ending. If there is, the program then checks to see if there is a "ck", "nk" or "ng" before the "le" 78. If so, the "le" is divided off the word 80. If not, the word is divided three letters from the end At this point the program will check to see if the word is a compound word 84. If it is, the word is divided between the compounds 88. If not, the program will check to see if there is a prefix If the prefix is an "ex", "trans", "tel/e" or "par/a" prefix 90, then the prefix is divided off the word 92. Or if the prefix is "tri", "dis" or "re" preceding the vowel 94, then the prefix is divided off the word 96. Otherwise, the program will check to see if there is a suffix 98.

If the suffix is on the second syllable 100, the program checks to see if the suffix is "or" or "al" 106. If so, the suffix is not divided off the word 112.

The user may then be prompted to place a "v" over remaining vowel groups 234. The number of total vowel groups marked represent the number of syllables in the word.

If there is just one vowel group 236, then the word is not divided 242. The program then cycles forward by identifying the phonogram (from the vowel to the end of each syllable), having the computer speak the word 252 and ending 260.

If there is not just one vowel group 236, then the program checks to see if the vowel pattern is "io", "ia", "iu" or "ua" 238. If so, the word is divided between these vowels 244. If not, the program checks to see if the word is a five syllable (five vowel cluster) word 240.

If so, prefixes ending a vowel are divided off the word 246. Once the prefix is divided off the word 246, or if the word is not a five-syllable word 240, then the program checks to see if there is a vccv pattern ("v" indicates a vowel and "c" indicates a consonant) 248.

If there is such a pattern and the consonant cluster ends in "l", "r" or "h" or begins with "s" 254, then the word is divided before the consonant cluster 256. Otherwise, the word is divided between the consonants 258. At this point, or if there was not a vccv pattern 248, the program checks to see if there is a vcv pattern 250. If not, the program cycles forward 252 and ends 260.

If there is one vcv pattern 250 in a two-syllable word 262, then the word is divided in a v/cv pattern 272, the program cycles forward 252 and ends 260. If there is not one vcv pattern in a two-syllable word 262, the program checks for a three-syllable word with one or more vcv patterns 264. If the program does not find such a word, it then checks for a four- or five-syllable word with one or more v/cv patterns 296. If these patterns are found, the patterns are divided as v/cv 298 and the program cycles forward 252 and ends 260.

If there is a three-syllable word with one or more vcv patterns 264, the program checks to see if it is a word without a suffix 266. If so, the word is divided as an isolated vcv pattern as v/cv, or as a vcvcv pattern as vc/v/cv (but not a last "e") 274, the program cycles forward 252 and ends 260.

Otherwise, if the word has a suffix 266, the program looks at the suffix immediately succeeding the base word 268. If it is not a regular suffix 270, the program checks to see if there is one isolated vcv pattern in the word with the irregular suffix 280. If so, the word is divided in a v/cv pattern 290, the program cycles forward 252 and ends 260.

If there is not one isolated vcv pattern in the word with the irregular suffix 280, then the program checks to see if the second vowel and succeeding consonant are "er" or "el" 282. If so, the word is divided in a vc/vc/v pattern 292; or if not, the word is divided in a vc/v/cv pattern 294. Then the program cycles forward 252 and ends 260.

However, if the suffix is regular 270, the computer checks to see if the suffix is "ment", "tic" or "cal" 276 If the suffix is not one of these 276, then the word is divided in a v/cv pattern 278, the program cycles forward 252 and ends 260. If the suffix is one of these 276, then*the program determines if there is one v/cv pattern 284. If there is, then the word is divided in a v/cv pattern 286 and the program then cycles forward 252 and ends 260. Or if there is not, then the word is divided in a vc/v/cv pattern (the last part of the pattern may be in a suffix) 288, the program then cycles forward 252 and ends 260.

However, if there is a suffix 98 and the suffix is on the second syllable 100 and the second syllable is not "or" or "al" 106, then the program checks to see if "es" follows a word ending in "s", "ss", "m", "ch", "sh" or "x" 108 If so, the "es" is divided off the word 114, and the program cycles forward 234 through the end of the program 252, 260. Otherwise, the program checks to see if the suffix is a regular suffix 110.

If it is a regular suffix 110 which is "er", "ed" or "ing" 116, then the program checks to see if "er", "ed" or "ing" follows a dropped "e" 120. If so, the suffix is not divided off the word 128 and the program cycles forward 234 through the end of the program 252, 260.

If the suffix does not follow a dropped "e" 120, then the program determines if "er", "ed" or "ing" follows doubled consonants 122. If so, the word is divided between the doubled consonants 130 and the program cycles forward 234 to the end 252, 260.

If the suffix did not follow doubled consonants 122, then the program determines if the suffix is "er" 124. If it is, then the program checks to see if "er" follows a diphthong, two-vowel sound or final "y" sound 132. If so, the word is divided before the "er" 134. Either way, thereafter the program cycles forward 234 and ends 252, 260. Yet if the suffix is "ed" or "ing" 126, then the suffix is divided off the word 136 and then the program cycles forward 234 and ends 252, 260.

However, if the suffix is not "er", "ed" or "ing" 116, then the suffix is divided off the word 118. At this point the program determines if the base word changed from last "y" to "ies" or "ied" 138. If so, the word is divided before the consonant preceding "ies" or "ied" 144, then the program cycles forward 234 and ends 252, 260.

Otherwise, if the base word did not change 138, then the program determines if a short vowel phonogram with doubled consonants precedes the suffix 140. If so, the word is divided between the doubled consonants 146, and the program cycles forward 234 and ends 252, 260.

If there is not a short vowel phonogram 140, then the phonogram determines if there was a last "e" on the base word 142. If so, the program also determines if the last "e" was dropped before adding a vowel suffix 148. If the last "e" was dropped, then the suffix is not divided off the word 150, but if the last "e" was not dropped, then the suffix is divided off the word 152. Either way, thereafter the program cycles forward 234 and ends 252, 260.

However, if there was not a last "e" on the base word 142, then the program determines if a "y" (as "i") two-vowel, diphthong phonogram (without an ending consonant) precedes the suffix 154. If so, the suffix is divided off the word 158, and the program cycles forward 234 and ends 252, 260. If not, the program does not divide the suffix off the word 160, cycles forward 234 and ends 252, 260.

However, if there is a suffix 98, but it is on the third syllable 102, then the program determines if there are two suffixes 162. If there are, then the last suffix is divided off the word 168. Thereafter, or if there are not two suffixes, then the program checks the suffix succeeding the base word 164 and determines if there was a last "e" on the base word 166. If there is a last "e", then the program determines if the last "e" was dropped before adding the vowel suffix 170. If so, then the vowel suffix is not divided off the word 172; or if not, then the vowel suffix is divided off the word 174. Next, the program cycles forward 234 and ends 252, 260.

If there was not a last "e" on the base word 166, then the program determines if "es" follows a word ending in "s", "ss", "ch", "sh" or "x" 176. If so, the "es" is divided off the word 182, the program cycles forward 234 and ends 252, 260. If not, the program determines if the base word changed last "y" to "ies" or "ied" 178. If so, the suffix is not divided off the word 184, the program cycles forward 234 and ends 252, 260. If not, the program determines if there is a short vowel phonogram with double consonants preceding the suffix 180. If so, then the word is divided between the double consonants 186, the program cycles forward 234 and ends 252, 260. If not, then the program determines if there is a two-vowel or diphthong (without ending consonant) preceding the suffix 188.

If so, the suffix is divided off the word 192, the program cycles forward 234 and ends 252, 260. Otherwise, the program determines if the suffix is a regular suffix 190. If the suffix is not a regular suffix 190 or if the suffix is not an irregular suffix 208, then the program cycles forward 234 and ends 252, 260. But if the suffix is an irregular suffix 208, then the suffix is not divided off the base word 210 and the program cycles forward 934 and ends 252, 260.

However, if the suffix is regular 190 and the suffix is not an "ed" or "ing" suffix 194, then the suffix is divided off the word 198, the program cycles forward 234 and ends 252, 260. Otherwise, if the suffix is an "ed" or "ing" suffix 194, then the program determines if the "ed" or "ing" suffix follows a dropped "e" 196. If so, the suffix is not divided off the word 202 and the program cycles forward 234 and ends 252, 260.

If the "ed" or "ing" suffix does not follow a dropped "e" 196, then the program determines if the "ed" or "ing" suffix follows doubled consonants 200. If so, the word is divided between the doubled consonants 204. If not, the "ed" or "ing" are divided off the word 206. Either way, the program then cycles forward 234 and ends 252, 260.

However, if there is a suffix 98 and the suffix is on the fourth or fifth syllable 104, then the program determines if there was a last "e" on the base word 212. If so, the program then determines if the "e" was dropped before adding the vowel suffix 222 and if it was, then the suffix is not divided off the word 224. Otherwise, the suffix is divided off the word 226. Either way the program cycles forward 234, and ends 252, 260.

If there was not a last "e" on the base word 212, and the base word changed the last "y" to "ies" or "ied" 214, then the suffix is not divided off the word 228. The program cycles forward 234 and ends 252, 260.

If the base word did not change the last "y" 214, then the program determines if there is a regular suffix 216. If so, the suffix is divided off the word 230, the program cycles forward 234 and ends 252, 260.

If the suffix is not regular 226, but irregular 228, then the suffix is not divided off the word 232. Otherwise, if the suffix is not regular 216 or irregular 218, then the word is divided in a v/vc pattern 220. Either way, the program cycles forward 234 and ends 252, 260.

The method of the present invention is capable of exploitation in the business, industry, education, and recreation industries and is particularly adaptable for use in a computer program and computer system for the teaching of reading and spelling.

The embodiments illustrated and discussed in the specification are intended only as exemplary and the many other feasible embodiments within the scope of this invention will be readily understood and appreciated by those skilled in the art. Nothing in the specification should be considered as limiting the scope of the present invention. Many changes may be made by those skilled in the art to produce a highly effective method and apparatus, without departing from the invention. The present invention should be limited only by the claims.

I claim:

1. A method for teaching reading to a learner comprising:
    (a) showing to the learner a printed word to be read, the printed word having at least two syllables;
    (b) directing the learner to decode the printed word, by having the learner
        (i) identify all vowels in the printed word,
        (ii) identify all consonants in the primed word beginning with the first consonant after the first vowel and ending with the consonant before the last vowel,
        (iii) identify all syllables in the primed word using syllabication rules previously taught to the learner,
        (iv) identify all phonograms in the printed word, where each phonogram in a syllable is from the first vowel to the end of the syllable, and identify any consonant or consonant clusters preceding the phonogram in each syllable with the exception of suffixes, and
        (v) identify each suffix, if any;
    (c) directing the learner, after the learner has decoded the printed word, to pronounce the printed word using the decoded syllables, phonograms, consonants, consonant clusters, and suffixes; and,
    (d) having the learner listen to correct pronunciation of the printed word.

2. The method of claim 1 wherein said syllabications rules include syllabifying the printed word between any of the following vowel patterns: "io," "ia," "iu," or "ua."

3. The method of claim 1 wherein said syllabication rules include syllabifying the printed word if there is a vowel(V)-consonant(C)-vowel (V)-consonant(C)-vowel(V) pattern into the syllables VC, V, and CV, if the printed word ends with an irregular suffix, where:
    (a) the irregular suffixes for two syllable words include:

| al | tic | y | ar | ent | ic | age |
|----|-----|---|----|----|----|----|
| ate | | | | | | | and
    (b) the irregular suffixes for three syllable words include:

| ant | ate | ar/y | age | ice | ent |
|-----|-----|------|-----|-----|-----|
| al | ies/ied | tive | ty | fy | or |
| an | ize | ive | y | ance | ite |
| lous | en | ture | u/al | id | ile |
| ous | ence | ure | some | in | o/ry |
| ar | a/bly | i/ty | it | on | | and
    (c) the irregular suffixes for four and five syllable words include:

| ant | ance | ent | ar | ar/y | y | ate |
|-----|------|-----|----|----|---|-----| and
the second VC pattern is not "er" or "el," if the second VC pattern is "er" or "el," then the VCVCV pattern is syllabified into the syllables VC, VC and V.

4. The method of claim 1 wherein said syllabication rules include not dividing off the final "e" from any printed word ending with an "e."

5. The method of claim 1 wherein said syllabication rules include syllabifying the suffix from a printed word, where the last "e" of the printed word was not dropped before adding the suffix.

6. The method of claim 1 wherein said syllabication rules for two and three syllable words include not syllabifying a vowel suffix when an "e" was dropped from the printed word before adding the vowel suffix which is other than "er," "ed," or "ing."

7. The method of claim 1 wherein said syllabication rules for three syllable words include syllabifying a vowel(V)-consonant(C)-vowel(V)-consonant(C)-vowel (V) pattern into the syllables VC, V and CV when the last vowel of the printed word is not a last "e."

8. A method for teaching reading and spelling to a learner comprising:
    (a) showing a word to the learner to be read and spelled, the word having at least two syllables;
    (b) directing the learner to decode the word, by having the learner
        (i) identify all vowels in the word,
        (ii) identify all consonants in the word beginning with the first consonant after the first vowel and ending with the consonant before the last vowel,
        (iii) identify all syllables in the word using syllabication rules previously taught to the learner,
        (iv) identify all phonograms in the word, where each phonogram in a syllable is from the first vowel to the end of the syllable, and identify any consonant or consonant clusters preceding the phonogram in each syllable with the exception of suffixes, and
        (v) identify each suffix, if any;
    (c) after directing the learner to pronounce the word using the decoded syllables, phonograms, consonants, consonant clusters, and suffixes;
    (d) having the learner listen to correct pronunciation of the word; and,
    (e) removing the word in primed form from the view of the learner and directing the learner to encode the word.

* * * * *